US010810811B2

(12) United States Patent
Kwon et al.

(10) Patent No.: US 10,810,811 B2
(45) Date of Patent: Oct. 20, 2020

(54) ELECTRONIC DEVICE AND METHOD FOR MANAGING ELECTRONIC KEY THEREOF

(71) Applicant: SAMSUNG ELECTRONICS CO., LTD., Suwon-si, Gyeonggi-do (KR)

(72) Inventors: Hyukjoon Kwon, Suwon-si (KR); Hojung Lee, Suwon-si (KR); Hyungil Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/294,084

(22) Filed: Mar. 6, 2019

(65) Prior Publication Data

US 2019/0279448 A1 Sep. 12, 2019

(30) Foreign Application Priority Data

Mar. 6, 2018 (KR) .................. 10-2018-0026288

(51) Int. Cl.
*G07C 9/00* (2020.01)
*H04W 12/04* (2009.01)
(Continued)

(52) U.S. Cl.
CPC .......... *G07C 9/00182* (2013.01); *B60R 25/24* (2013.01); *E05B 47/00* (2013.01);
(Continued)

(58) Field of Classification Search
CPC ............ G07C 9/00182; G07C 2209/08; G07C 9/00571; G07C 2009/00793; H04W 12/04;
(Continued)

(56) References Cited

U.S. PATENT DOCUMENTS 8,593,249 B2 * 11/2013 Bliding .................. E05B 49/00
340/5.2
8,787,902 B2 * 7/2014 Kim ...................... H04W 12/06
455/426.1
(Continued)

FOREIGN PATENT DOCUMENTS

JP 2005-285056 10/2005
KR 10-1588197 2/2016
(Continued)

OTHER PUBLICATIONS

Search Report and Written Opinion dated Jun. 17, 2019 in counterpart International Patent Application No. PCT/KR2019/002588.

*Primary Examiner* — Nam V Nguyen
(74) *Attorney, Agent, or Firm* — Nixon & Vanderhye P.C.

(57) ABSTRACT

An electronic device and a method for managing an electronic key thereof are provided. The electronic device includes a wireless communication circuit, a hardware-based security element comprising circuitry configured to provide a timestamp, a processor operatively coupled with the communication circuit and the security element, and a memory operatively coupled with the processor. The memory stores instructions that when executed by the processor, control the electronic device to: launch an application related with an electronic key of a door lock, receive an input for using the electronic key to open the door lock through the application, determine the validity of credential information related with the input, based at least in part on the timestamp, and open the door lock based on the validity of the credential information.

18 Claims, 14 Drawing Sheets

(51) Int. Cl.
    *E05B 47/00*     (2006.01)
    *B60R 25/24*     (2013.01)
    *H04W 12/00*     (2009.01)
    *G06F 9/445*     (2018.01)

(52) U.S. Cl.
    CPC ......... *H04W 12/001* (2019.01); *H04W 12/04* (2013.01); *G06F 9/445* (2013.01)

(58) Field of Classification Search
    CPC ...... H04W 12/001; E05B 47/00; B60R 25/24; H04L 2463/062; H04L 2463/121; H04L 63/061; G06F 9/445
    USPC ....................................................... 340/5.64
    See application file for complete search history.

(56) References Cited

U.S. PATENT DOCUMENTS

| | | | | |
|---|---|---|---|---|
| 9,595,145 | B2 * | 3/2017 | Avery | G07C 9/00119 |
| 10,008,061 | B2 * | 6/2018 | Klink | H04W 12/0804 |
| 10,131,322 | B2 * | 11/2018 | Hoyos | H05K 999/99 |
| 10,171,974 | B2 * | 1/2019 | Ahearn | G07C 9/00571 |
| 10,382,608 | B2 * | 8/2019 | Gerhardt | H04L 63/08 |
| 10,395,452 | B2 * | 8/2019 | Morrison | H04W 12/0605 |
| 10,462,109 | B2 * | 10/2019 | Mathias | H04L 63/061 |
| 10,548,084 | B1 * | 1/2020 | Venkateswaran | H04W 52/028 |
| 2014/0120905 | A1 | 5/2014 | Kim | |
| 2015/0175127 | A1 * | 6/2015 | Hatton | B60R 25/24 455/420 |
| 2017/0103647 | A1 * | 4/2017 | Davis | G06F 1/3287 |
| 2017/0352215 | A1 * | 12/2017 | Maiwand | G07C 9/00896 |
| 2018/0114387 | A1 * | 4/2018 | Klink | H04W 12/0608 |
| 2018/0248704 | A1 * | 8/2018 | Coode | H04L 9/0825 |
| 2019/0065732 | A1 | 2/2019 | Woo et al. | |

FOREIGN PATENT DOCUMENTS

| | | |
|---|---|---|
| KR | 10-2017-0048953 | 5/2017 |
| KR | 10-1733453 | 5/2017 |
| KR | 10-2018-0075920 | 7/2018 |
| WO | 2018/124741 | 7/2018 |

\* cited by examiner

ELECTRONIC DEVICE AND METHOD FOR MANAGING ELECTRONIC KEY THEREOF

CROSS-REFERENCE TO RELATED APPLICATION

This application is based on and claims priority under 35 U.S.C. § 119 to Korean Patent Application No. 10-2018-0026288, filed on Mar. 6, 2018, in the Korean Intellectual Property Office, the disclosure of which is incorporated by reference herein in its entirety.

BACKGROUND

Field

The disclosure relates to an electronic device and a method for managing an electronic key thereof.

Description of Related Art

Electronic devices (e.g., mobile terminals, smart phones, wearable devices, etc.) can provide various functions. For example, the smart phone can provide, in addition to a basic voice communication function, a short-range wireless communication (e.g., Bluetooth (BT), wireless fidelity (WiFi), near field communication (NFC), etc.) function, a mobile communication (e.g., 3-generation (3G), 4G 5G etc.) function, a music or video play function, a photographing function, a navigation function or the like.

Recent electronic devices can be used for controlling a door lock. For example, out of a door lock control scheme using a plastic card or a fob type smart key, the recent electronic devices can store an electronic key, and can use the stored electronic key to control the door lock.

The above information is presented as background information only to assist with an understanding of the disclosure. No determination has been made, and no assertion is made, as to whether any of the above might be applicable as prior art with regard to the disclosure.

SUMMARY

If satisfying a given condition (e.g., a period, the number of times, a location, etc.), the electronic device can provide the other electronic device with an electronic key (below, a temporal key) which includes credential information of limited use capable of controlling (e.g., releasing) a door lock.

Using the temporal key, the other electronic device can control the door lock during a given period or a given number of times. The temporal key can be managed through a server. For example, when the temporal key is used to control the door lock, the server can check whether the temporal key is valid according to the number of times of limit of the temporal key, a limit period or the like.

However, communication between the electronic device and the server may be unstable. If the communication is unstable, the electronic device may fail to check the validity of the temporal key through the server.

Various embodiments of the disclosure addressing the aforementioned problems may provide an electronic device and a method for managing an electronic key thereof, capable of safely managing a temporal key (e.g., checking the validity of the temporal key) regardless of a communication state with a server.

According to various embodiments of the disclosure, an electronic device includes, for example, a wireless communication circuit, a hardware-based security element comprising security circuitry configured to provide a timestamp, a processor operatively coupled with the communication circuit and the security element, and a memory operatively coupled with the processor. The memory stores instructions that, when executed, by the processor control the electronic device to: launch an application related with an electronic key of a door lock, receive an input that uses the electronic key to open the door lock through the application, determine the validity of credential information related with the input based at least in part on the timestamp, and open the door lock based on the validity of the credential information.

According to various embodiments of the disclosure, an electronic device includes, for example, a hardware-based security element comprising security circuitry configured to provide a timestamp, a near field communication (NFC) communication circuit, a processor operatively coupled with the communication circuit and the security element, and a memory operatively coupled with the processor. The memory stores instructions that, when executed by the processor, control the electronic device to: receive a request of transmission of an electronic key for opening of a door lock from the door lock through the communication circuit in response to approaching within a specific distance from the door lock, search an electronic key related with the door lock, determine the validity of credential information related with the searched electronic key based at least in part on the timestamp, and open the door lock based on the validity of the credential information.

According to various embodiments of the disclosure, a method for managing a credential in an electronic device includes launching an application related with an electronic key of a door lock, receiving an input that uses the electronic key to open the door lock through the application, determining the validity of credential information related with the input based at least in part on a timestamp provided by a hardware-based security element, and controlling opening or non-opening of the door lock based on the validity of the credential information.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
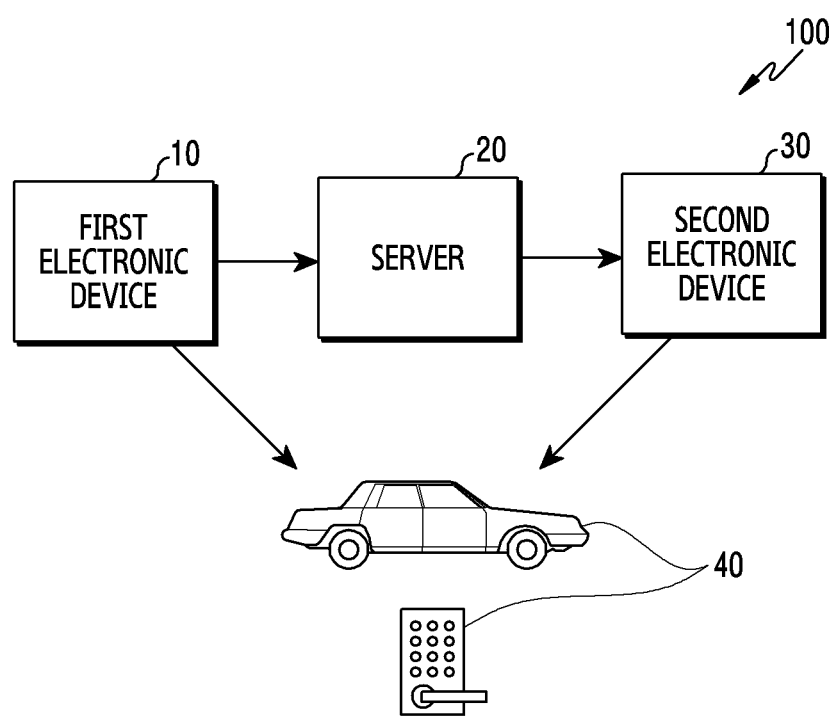
FIG. 1 is a diagram illustrating an example electronic key management system according to an embodiment of the disclosure.

Various example embodiments of the disclosure are described in greater detail below with reference the accompanying drawings. In the present disclosure, specified embodiments are illustrated in the drawings and a related detailed description is mentioned, but this is not intended to limit various embodiments to a specified form. For example, it may be apparent to a person having ordinary skill in the art to which the disclosure pertains that embodiments of the disclosure may be modified diversely.

FIG. 1 is a diagram illustrating an example electronic key management system according to an embodiment of the disclosure.

Referring to FIG. 1, the electronic key management system 100 of an embodiment of the disclosure may include a first electronic device 10, a server 20, a second electronic device 30 and a door lock 40.

The first electronic device 10 and the second electronic device 30 of an embodiment of the disclosure may include, for example, and without limitation, smart phones, wearable devices, tablet personal computers (PC), or the like. Below, a description is made that the first electronic device 10 is an electronic device of an owner of the door lock 40, and the second electronic device 30 is an electronic device (or another electronic device of a host) of a guest (e.g., a friend, a family, a resident, a parcel service provider, etc.) capable of temporally controlling the door lock 40. According to some embodiments, the first electronic device 10 may be operated as the second electronic device 30, and the second electronic device 30 may be operated as the first electronic device 10, according to a given situation.

The first electronic device 10 of an embodiment of the disclosure may store an electronic key for controlling the door lock 40. For example, the first electronic device 10 may receive an electronic key from the server 20 through a smart key application (e.g., "App") provided by a manufacturer of the door lock 40. The electronic key may include key information and credential information. The key information, information associated with the electronic key, may represent attribute information of the electronic key. The credential information may represent a secret value that is granted to the electronic key, wherein the secret value verifies a qualification capable of controlling a door lock. For example, the credential information may include, for example, and without limitation, at least any one of a password, a certificate, an authentication key, or the like. The key information and the credential information may include identification information, and may be mutually mapped based on the identification information of the electronic key.

The first electronic device 10 of an embodiment of the disclosure may manage (e.g., issue and delete) an electronic key (e.g., a temporal key) which includes credential information of limited use capable of controlling the door lock 40 during a given condition (e.g., a limit period/date, a limited number of times, etc.). For example, the first electronic device 10 may transmit a request for issuance of a temporal key to the server 20. The issuance request may include a key type (e.g., a normal type, a limited type), a limit condition such as a limit period/date, the number of times of limit (e.g., ten times), etc., and information (e.g., phone number) of an issuance object (e.g., the second electronic device 30).

The first electronic device 10 may send a request for deletion of the temporal key to the server 20. A detailed description of the temporal key issuance and deletion of the first electronic device 10 is provided below with reference to FIG. 5A and FIG. 5B.

The server 20 of an embodiment of the disclosure may manage an electronic key. The server 20 may be managed by a manufacturer of the door lock 40. In response to the transmission of an electronic key of the door lock 40 being requested from a smart key App installed in the first electronic device 10, the server 20 may authenticate a user of the first electronic device 10 and transmit the electronic key to the first electronic device 10.

In response to the distribution (or issuance) of a temporal key being requested from the first electronic device 10, the server 20 of an embodiment of the disclosure may provide the temporal key (e.g., a temporal key which is available during a given period, is available during a given number of times, etc.) and transmit the same to a corresponding electronic device (e.g., the second electronic device 30). The temporal key may be encrypted and transmitted, wherein the temporal key is able to be decrypted by a hardware-based security element (e.g., a trust zone) of the second electronic device 30.

The server 20 of an embodiment of the disclosure may check the validity of an electronic key. For example, in response to a request for check of the validity of a temporal key being received from the second electronic device 30, the server 20 may check the validity, and transmit its result to the second electronic device 30.

The server 20 of an embodiment of the disclosure may transmit a request for deletion of a temporal key to the second electronic device 30. For example, the server 20 may receive a request for deletion of the temporal key from the first electronic device 10 or in response to a limit period of the temporal key or the number of times of limit expiring, the server 20 may transmit the request for deletion of the temporal key to the second electronic device 30.

According to some embodiments, the server 20 may receive a notification (or notice) for deletion of a temporal key from the second electronic device 30.

The second electronic device 30 of an embodiment of the disclosure may receive a temporal key from the server 20 and store the received temporal key, thereby controlling the door lock 40 in a limited condition. For example, the second electronic device 30 may have an authority of being capable of opening the door lock 40 during a given period or number of times. The second electronic device 30 may store the temporal key in an embedded secure element (eSE) of a near field communication (NFC) module. According to some embodiments, the temporal key may be stored in an eSE included in another element (e.g., a SIM card) of the second electronic device 30.

In response to a command of opening of the door lock 40 being received by a user (e.g., a specific electronic key being selected through a smart key App), or NFC communication with the door lock 40 being performed, the second electronic device 30 of an embodiment of the disclosure may identify whether the electronic key is a temporal key. In response to the temporal key being the identifying result, the second electronic device 30 may identify whether the temporal key is valid. For example, the second electronic device 30 may send a request for check of the validity of the temporal key to the server 20 and receive its result. According to some embodiments, the second electronic device 30 may determine the validity of the temporal key, at least partially based on a timestamp provided by a hardware-based security element (e.g., a trust zone). Because the hardware-based security element is an element for which hacking is impossible, an embodiment of the disclosure may prevent and/or reduce manipulation of a use period of the temporal key through timestamp manipulation.

According to some embodiments, in response to a request for opening of the door lock 40 being received, the second electronic device 30 may identify a communication state with the server 20. In response to the communication state satisfying a given condition (e.g., being equal to or being more than (or exceeding) a reference value), the second electronic device 30 may send a request for determination of the validity of the temporal key to the server 20. In response to the communication state not satisfying the given condition (e.g., being less than (or being equal to or being less than) the reference value), the second electronic device 30 may use a timestamp of the hardware-based security element, to determine (or check) the validity of the temporal key.

In response to the temporal key being valid, the second electronic device 30 may transmit the temporal key (or a credential) to the door lock 40 using a short-range communication module (e.g., near field communication (NFC), magnetic secure transmission (MST), Bluetooth (BT), Bluetooth low energy (BLE), etc.). The second electronic device 30 may receive a response to a door lock opening request from the door lock 40. A detailed description for control of the door lock 40 using the temporal key of the second electronic device 30 is provided below with reference to FIG. 6 to FIG. 11.

The door lock 40 of an embodiment of the disclosure may refer, for example, to a locking device for limiting entrance, and may be not only attached to a gate located in a house, a building, a hotel and/or an office but also may be attached to a door of a car, a trunk or the like. The door lock 40 may have a unique credential capable of releasing locking. At manufacturing, the credential may be stored in a memory (not shown) of the door lock 40 by a manufacturer. According to some embodiments, the door lock 40 having a communication function may receive a credential through the server 20 and store the same in the memory.

The door lock 40 of an embodiment of the disclosure may receive an electronic key or a temporal key (or credential) from the first electronic device 10 or the second electronic device 30. For example, the door lock 40 may receive the electronic key or the temporal key from the first electronic device 10 or the second electronic device 30 through a short-range wireless communication module. According to some embodiments, the door lock 40 may receive the electronic key or the temporal key through a mobile communication network.

In response to receiving the electronic key or the temporal key from the first electronic device 10 or the second electronic device 30, the door lock 40 may obtain a credential (e.g., a first credential) from the received electronic key or temporal key, and compare the obtained credential with a credential (e.g., a second credential) stored in the memory (not shown). In response to the first credential and the second credential being consistent based on the comparison result, the door lock 40 may control a driving unit (not shown) (e.g., a motor, an electromagnet, etc.) to release locking.

In response to the locking being released normally, the door lock 40 of an embodiment of the disclosure may transmit data corresponding to a release success to an electronic device (e.g., the first electronic device 10 or the second electronic device 30) that has sent a locking release request.

Figure 2:
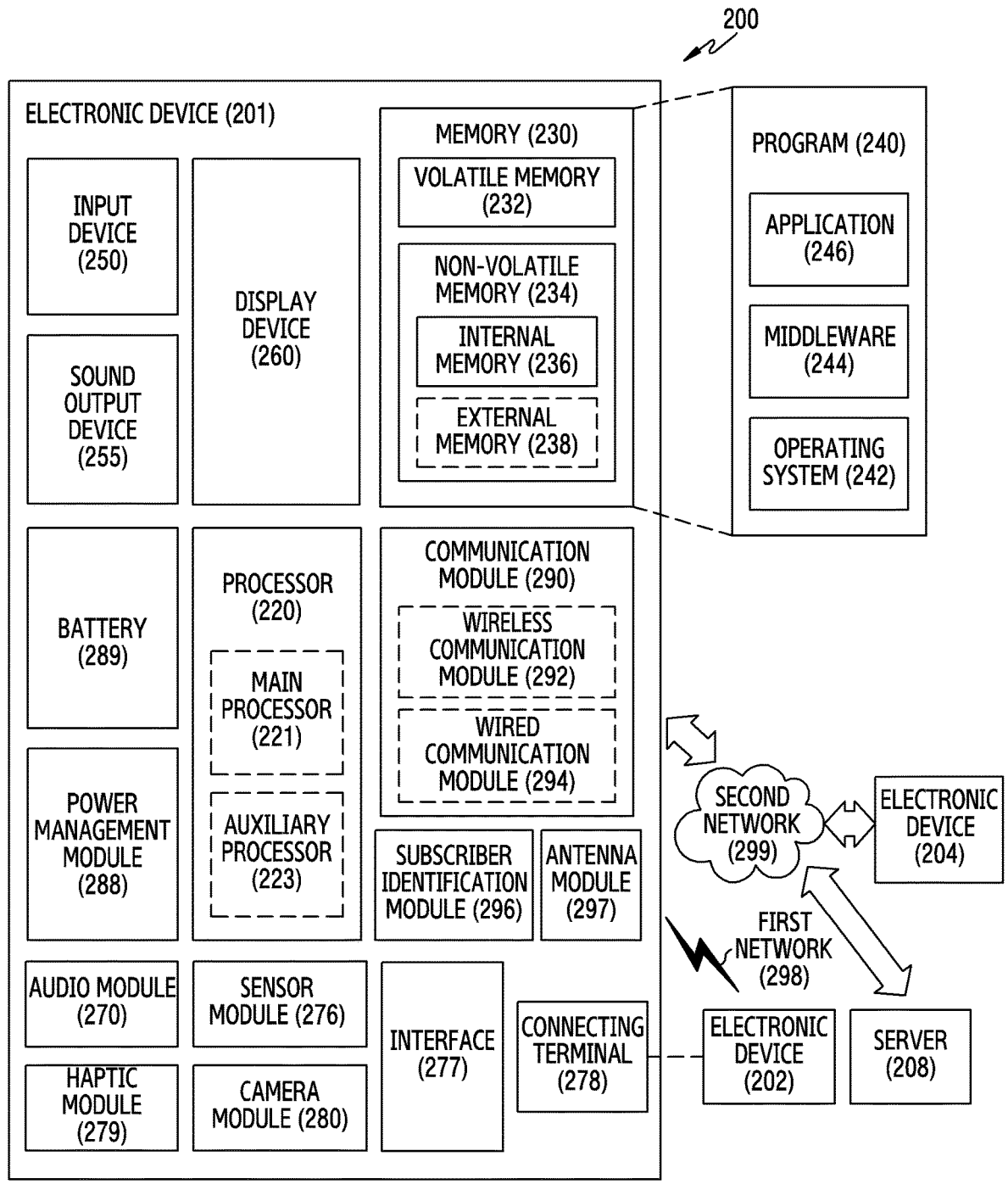
FIG. 2 is a block diagram illustrating an example electronic device within a network environment according to various embodiments of the disclosure.

FIG. 2 is a block diagram of illustrating an example electronic device within a network environment according to various embodiments of the disclosure.

Referring to FIG. 2, the electronic device 201 (e.g., a first electronic device (10) of FIG. 1) in the network environment 200 may communicate with an electronic device 202 (e.g., a door lock (40) of FIG. 1) via a first network 298 (e.g., a short-range wireless communication network), or an electronic device 204 (e.g., a second electronic device (30) of FIG. 1) or a server 208 (e.g., a server (20) of FIG. 1) via a second network 299 (e.g., a long-range wireless communication network). According to an embodiment, the electronic device 201 may communicate with the electronic device 204 via the server 208. According to an embodiment, the electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments, at least one (e.g., the display device 260 or the camera module 280) of the components may be omitted from the electronic device 201, or one or more other components may be added in the electronic device 201. In some embodiments, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input device 250 may receive a command or data to be used by other component (e.g., the processor 220) of the electronic device 201, from the outside (e.g., a user) of the electronic device 201. The input device 250 may include, for example, a microphone, a mouse, a keyboard, or a digital pen (e.g., a stylus pen).

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment, the audio module 270 may obtain the sound via the input device 250, or output the sound via the sound output device 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., PCB). According to an embodiment, the antenna module 297 may include a plurality of antennas. In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 and 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

Figure 3:
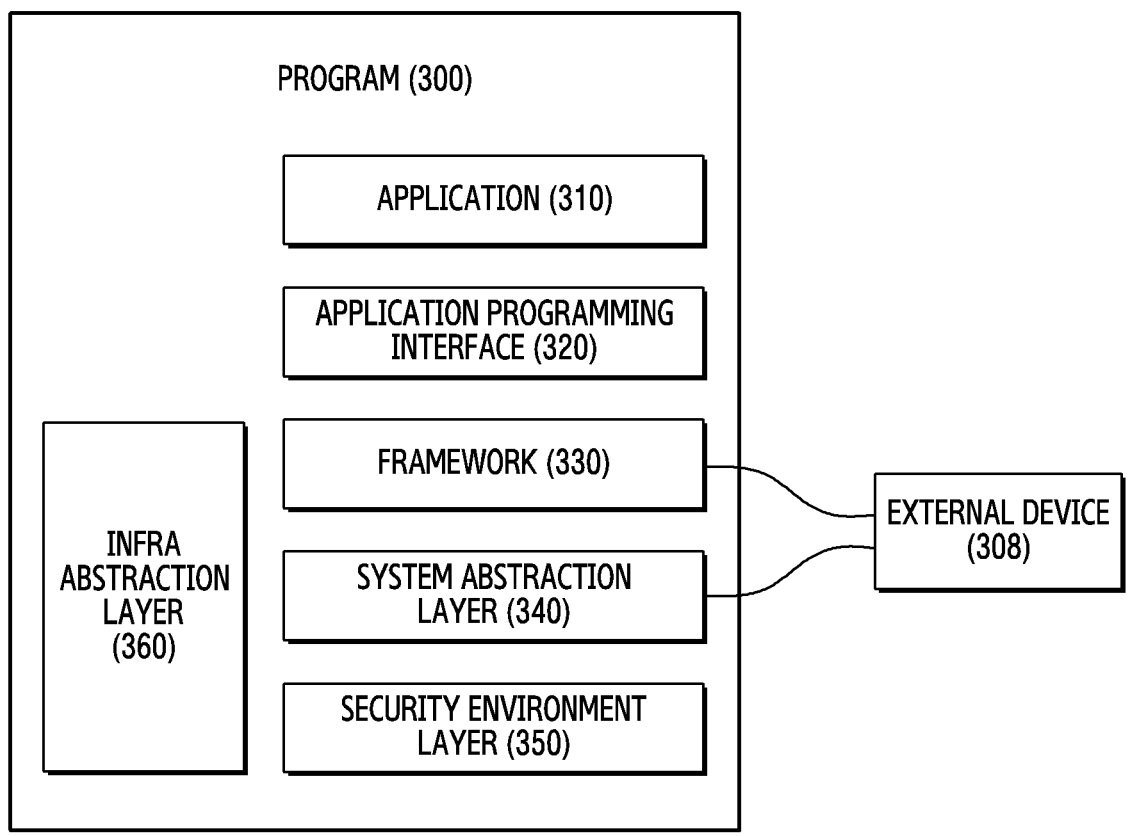
FIG. 3 is a block diagram illustrating an example program module according to various embodiments of the disclosure.

FIG. 3 is a block diagram illustrating an example program module according to various embodiments of the disclosure.

Referring to FIG. 3, an electronic device (e.g., the electronic device 201) may be driven based on the program module 300 (e.g., the program 240), and may communicate with an external device 308 (e.g., the server 20 of FIG. 1, and the server 208 of FIG. 2). The program module 300 may include an application 310 (e.g., the application 246 of FIG. 2), an application programming interface (API) 320, a framework 330, a system abstraction layer 340, a security environment layer 350 and an infra abstraction layer 360. At least part of the program module 300 may be preloaded on the electronic device or be downloaded from the external device 308.

The application 310 (e.g., a smart key App) may be provided to enable the electronic device to visually use or manage an electronic key. The application 310 may include a graphic user interface (GUI) associated with the electronic key. The application 310 may be downloaded and installed from a server of a door lock manufacturer, an App store and the like.

The application programming interface 320 may provide all functions related with an electronic key, to a batch interface. For example, the application programming interface 320 is a set of APIs, e.g., application programming functions, and may be constructed differently according to an operating system (e.g., the operating system 242).

The framework 330 may provide interoperability between the external device 308 and the application programming interface 320. The framework 330 may communicate with the external device 308 that provides a service related with an electronic key.

The system abstraction layer 340 may provide interoperability between the external device 308 and the security environment layer 350. The system abstraction layer 340 may communicate with the external device 308 that provides a service related with a security of an electronic key.

The security environment layer 350 may provide a hardware or software-based security-enhanced storage environment. For example, the security environment layer 350 may provide a security-enhanced storage environment such as an embedded secure element (eSE), a trusted execution environment (TEE), etc.

To use an electronic key, the infra abstraction layer 360 may communicate with an external electronic device (e.g., the door lock 40 of FIG. 1, the electronic device 202 of FIG. 2). For example, using wireless communication such as, for example, and without limitation, NFC, BT, BLE, WiFi, MST, etc., the infra abstraction layer 360 may communicate with the external electronic device. The external electronic device may include a door lock. For example, the door lock may be attached, for example, and without limitation, to a door of a building, a room, a vehicle, a storage box, etc.

The external device 308 may provide a service related with an electronic key and a service related with a security of the electronic key. The external device 308 may manage information related with a user of the electronic device, the electronic key, and a provider of the electronic key. The external device 308 may provide a security protocol for the sake of security of the electronic key. According to an embodiment, the external device 308 may provide all of the service related with the electronic key and the service related with the security of the electronic key. According to another embodiment, the external device 308 may include a first server for the service related with the electronic key and a second server for the service related with the security of the electronic key.

Figure 4:
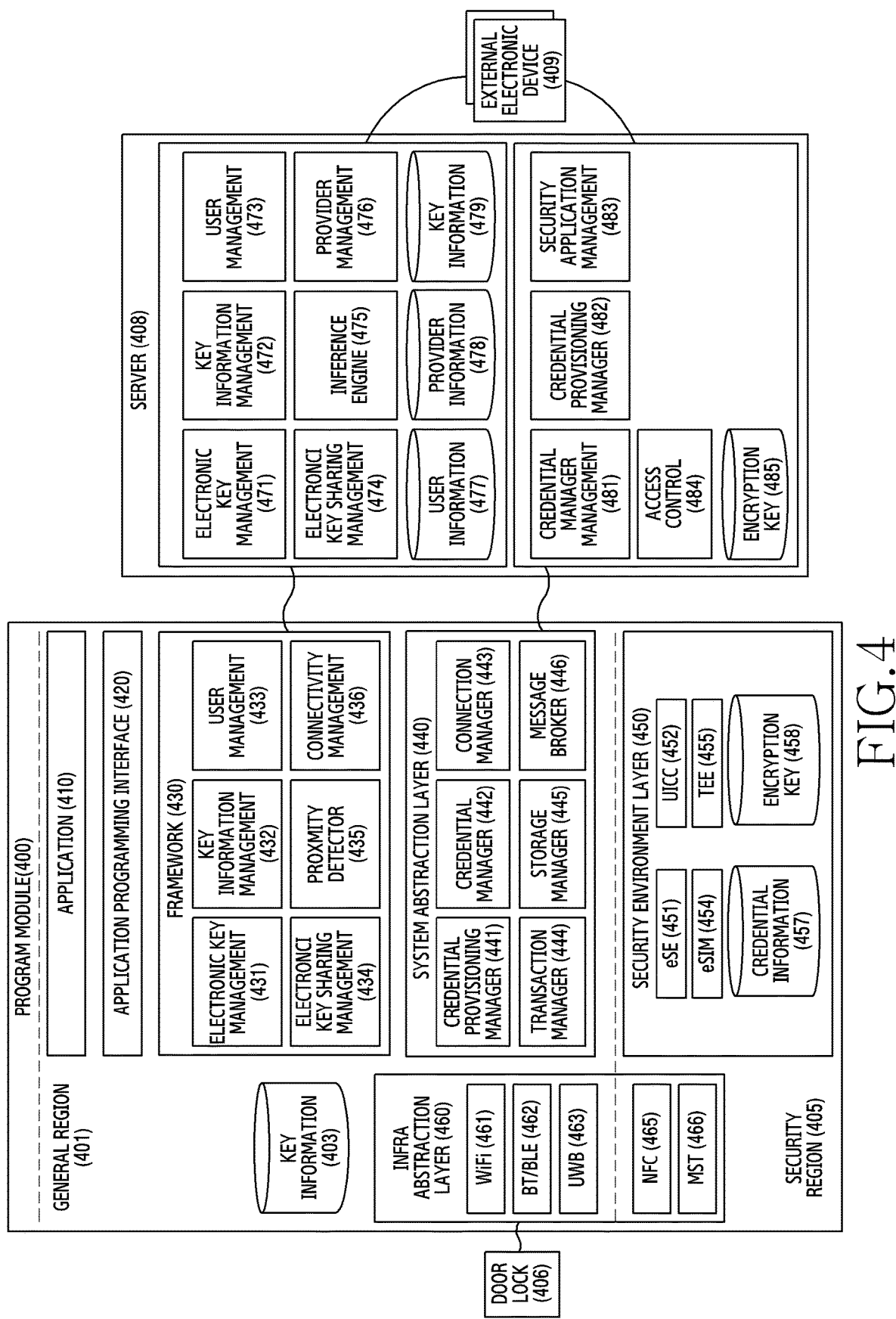
FIG. 4 is a block diagram illustrating an example program module according to various embodiments of the disclosure.

FIG. 4 is a block diagram illustrating an example program module according to various embodiments of the disclosure.

Referring to FIG. 4, an electronic device (e.g., the electronic device 201) may be driven based on a program module 400 (e.g., the program 240, the program module 300), and may communicate with a door lock 406 (e.g., the electronic device 202, a server 408 and an external electronic device 409). The server 408 may communicate with the external electronic device 409, to provide a service to the electronic device. The external electronic device 409 may refer, for example, to an electronic device of a provider configured to manufacture or manage the door lock 406, or a provider providing a service related with an electronic key such as, for example, and without limitation, a hotel, a car-rental agent, a parcel service client, etc. The external electronic device 409 may provide credential information of the electronic key.

The program module 400 may be comprised of a general region 401 and a security region 405. The program module 400 may include key information 403, an application 410 (e.g., the application 246 or the application 310), an application programming interface 420 (e.g., the application programming interface 320), a framework 430 (e.g., the framework 330), the system abstraction layer 440 (e.g., the system abstraction layer 340), a security environment layer 450 (e.g., the security environment layer 350), and an infra abstraction layer 460 (e.g., the infra abstraction layer 360).

The key information 403, the application 410, the application programming interface 420, the framework 430 and the system abstraction layer 440 may be provided by the general region 401. The security environment layer 450 may be provided by the security region 405. The infra abstraction layer 460 may be provided to at least any one of the general region 401 or the security region 405.

The key information 403 may include at least any one of identification information of an electronic key, identification information of an electronic device (e.g., the first electronic device 10 or the second electronic device 30), identification information of the door lock 406, a communication scheme for the electronic key, a name of the electronic key, a divider of the electronic key dependent on a provider, time data (e.g., a limit period) of the electronic key, location data of the electronic key, or state information of the electronic key.

The communication scheme for the electronic key is a communication scheme between an electronic device for electronic key use and the door lock 406, and may be, for example, and without limitation, identified as at least any one of wireless fidelity (WiFi), Bluetooth/Bluetooth low energy (BT/BLE), ultra wide band (UWB), near field communication (NFC) or magnetic secure transmission (MST). The name of the electronic key may be displayed in a graphical user interface, and may be identified, wherein the name of the electronic key is able to be recognized by a user. The divider of the electronic key may, for instance, be identified according to a business field (e.g., a hotel, a house, a car, an office, etc.) of the provider. The time data of the electronic key may represent a term of validity of the electronic key, and may include, for instance, a starting time point and an ending time point. The location data of the electronic key may represent an available location of the electronic key and may include, for instance, a latitude and longitude of the door lock. The state information of the electronic key may represent the existence or absence of credential information corresponding to the electronic key in the electronic device and, for instance, may be identified as any one of an inactive state or active state.

The framework 430 may include an electronic key management 431, a key information management 432, a user management 433, an electronic key sharing management 434, a proximity detector 435 and a connectivity management 436. The electronic key management 431 may manage an electronic key. The electronic key management 431 may provide the binding of a communication scheme for each electronic key, a storage location, an issuance state indicating issuance completion or issuance waiting, door lock information, etc. The key information management 432 may manage the key information 403. The user management 433 may manage information associated with a user of the electronic device. The user management 433 may manage at least any one of identification information of the electronic device or account information of the user. The electronic key sharing management 434 may share the electronic key with an external electronic device (e.g., the electronic device 204). The proximity detector 435 may obtain the door lock 406 within a predefined radius. The proximity detector 435 may obtain a distance between the electronic device and the door lock 406. The connectivity management 436 may manage a session for wireless coupling of the electronic device. The connectivity management 436 may manage a session for at least any one of coupling of the electronic device and the door lock 406 or coupling of the electronic device and the server 408 (e.g., the external device 308).

The system abstraction layer 440 may include a credential provisioning manager 441, a credential manager 442, a connection manager 443, a transaction manager 444, a storage manager 445 and a message broker 446. The credential provisioning manager 441 may provide and manage an encryption key 458 for security of credential information 457. The credential provisioning manager 441 may forward the encryption key 458 to the security environment layer 450. The credential manager 442 may manage the credential information 457. The credential manager 442 may receive the credential information 457 from the server 408, and forward the received credential information 457 to the security environment layer 450. The connection manager 443 may manage a coupling resource for the electronic device. The connection manager 443 may couple a session with at least any one of the door lock 406 or the server 408 or delete. The transaction manager 444 may trace a transaction in using and forwarding credential information. The storage manager 445 may identify a region managing the credential information 457 in the security environment layer 450. The storage manager 445 may store the credential information 457 in the security environment layer 450, or request for the stored credential information 457. The message broker 446 may provide a security protocol between the system abstraction layer 440 and the server 408.

The security environment layer 450 may provide a hardware or software-based security-enhanced storage environment. For example, the storage environment may include at least any one of an embedded secure element (eSE) 451, a universal integrated circuit card (UICC) 452, an embedded subscriber identity module (eSIM) 454, or a trusted execution environment (TEE) 455. The security environment layer 450 may store the credential information 457 of the electronic key and the encryption key 458. The credential information 457 may include identification information of the electronic key and a secret value for verifying a qualification capable of controlling the door lock 406. The encryption key 458 may be used for security of the credential information 457.

To use an electronic key, the infra abstraction layer 460 may wirelessly communicate with the door lock 406. For example, the wireless communication may include, for example, and without limitation, at least any one of wireless fidelity (WiFi) 461, Bluetooth/Bluetooth low energy (BT/BLE) 462, ultra wide band (UWB) 463, near field communication (NFC) 465 or magnetic secure transmission (MST) 466. The WiFi 461, the Bluetooth/Bluetooth low energy 462 and the UWB 463 may be provided to the general region 401, and the NFC 465 and the MST 466 may be provided to the security region 405.

The server 408 may include an electronic key management 471, a key information management 472, a user management 473, an electronic key sharing management 474, an inference engine 475 and a provider management 476. The electronic key management 471 may manage an electronic key. The electronic key management 471 may provide the binding of a communication scheme for each electronic key, a storage location, an issuance state indicating issuance completion or issuance waiting, door lock information, etc. The key information management 472 may manage key information 479 for each electronic key. The user management 473 may manage information associated with a user of the electronic device. The user management 473 may manage at least any one of identification information of the electronic device or account information of the user, and may provide single sign on (SSO). The electronic key sharing management 474 may share the electronic key with an external electronic device. The electronic key sharing management 474 may discover the external electronic device, and provide the electronic key to the external electronic device. The inference engine 475 may recommend the electronic key to the electronic device. The inference engine 475 may recommend the electronic key to the electronic device, based on at least any one of a distance between the electronic device and the door lock 406, a location of the door lock 406 or time. The provider management 476 may manage information associated with a provider (e.g., the external electronic device 409) of the electronic key. The server 408 may store user information 477 of the electronic key, provider information 478, and key information 479.

The server 408 may further include a credential manager management 481, a credential provisioning manager 482, a security application management 483, and an access control 484. The credential manager management 481 may manage the credential manager 442 of the electronic device. The credential provisioning manager 482 may provide and manage an encryption key 485 for security of credential information for each electronic key. The security application manager 483 may install and manage a security application in the security environment layer 450 of the electronic device. The access control 484 may manage a coupling resource for the electronic device. The access control 484 may couple a session with the electronic device or delete. The server 408 may store the encryption key 485.

Figure 5A:
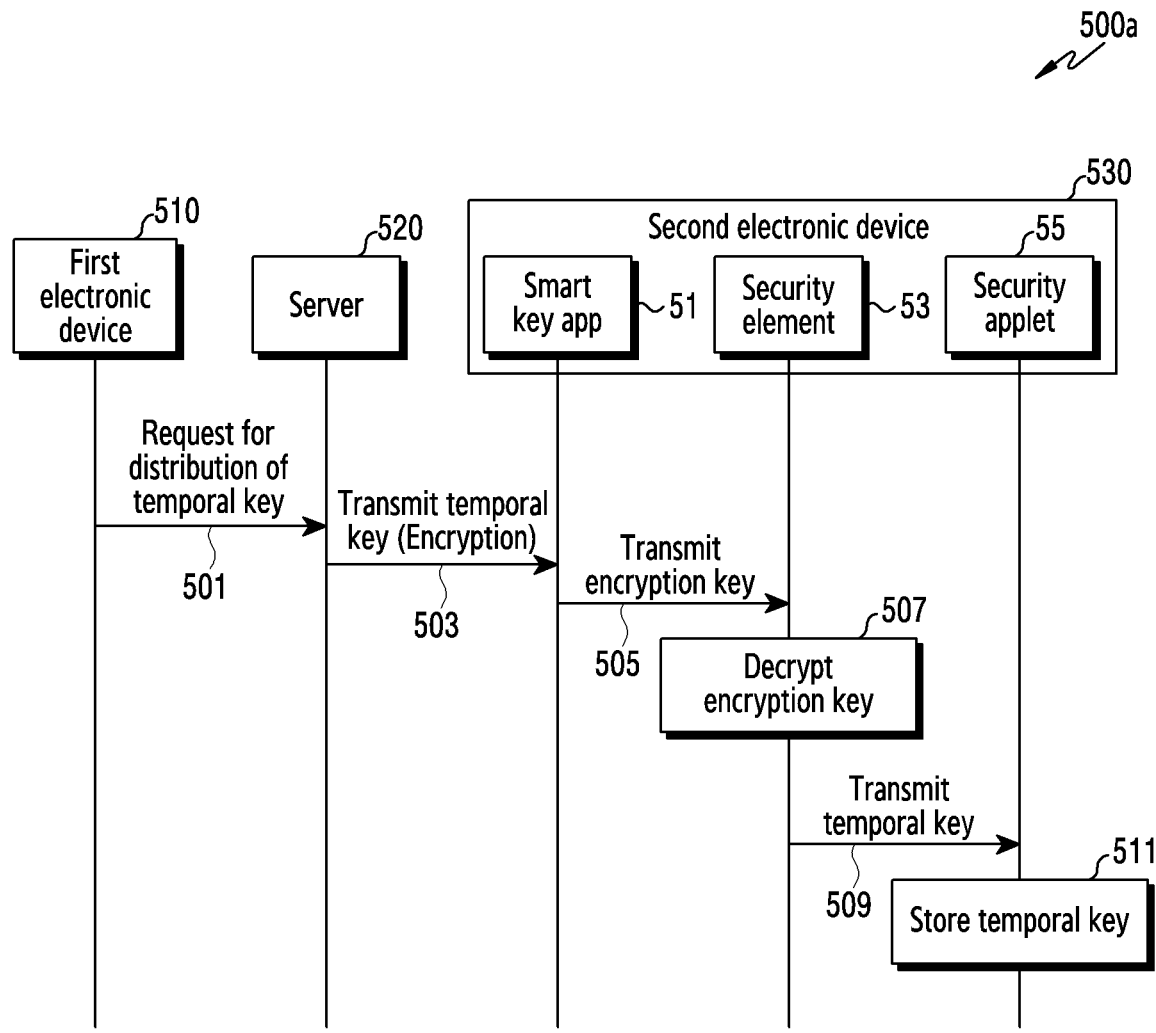
FIG. 5A is a flowchart illustrating an example procedure of issuing an electronic key according to an embodiment of the disclosure.

FIG. 5A is a flowchart illustrating an example procedure of issuing an electronic key according to an embodiment of the disclosure.

Referring to the flowchart 500a of FIG. 5A, in operation 501, a first electronic device 510 (e.g., the first electronic device 10 of FIG. 1 or the electronic device 201 of FIG. 2) of an embodiment of the disclosure may transmit a request for distribution of an electronic key (e.g., a temporal key) including credential information of limited use capable of temporally controlling a specific door lock (not shown) (e.g., the door lock 40 of FIG. 1 or the door lock 406 of FIG. 4), to a server 520 (e.g., the server 20 of FIG. 1, the server 208 of FIG. 2, the server 308 of FIG. 3, or the server 408 of FIG. 4). For example, the distribution request may include a key type (e.g., a limited type), a period, the number of times and/or identification information (e.g., phone number) of the second electronic device 530 (e.g., the second electronic device 30 of FIG. 1 or the electronic device 204 of FIG. 2). According to some embodiments, the first electronic device 510 may further transmit identification information of a door lock (e.g., a door lock to permit temporal control of the second electronic device 530) selected by a user among a plurality of door locks, to the server 520.

In operation 503, the server 520 of an embodiment of the disclosure may transmit a temporal key to a smart key App 51 of the second electronic device 530. For example, the server 520 may obtain a credential related with the first electronic device 510 from a memory (not shown) storing a credential, and may use the credential and a limit condition, to provide the temporal key. The provided temporal key may be encrypted and transmitted, wherein the temporal key is able to be decrypted only in the security element 53.

In operation 505, the smart key App 51 of the second electronic device 530 of an embodiment of the disclosure may transmit the encrypted temporal key (e.g., an encryption key) to a security element 53. The security element 53, a hardware-based security element, may be a trust zone. However, the security element 53 is not limited to the trust zone, and may be well-known various other security elements.

In operation 507, the security element 53 of the second electronic device 530 of an embodiment of the disclosure may decrypt the encryption key. In response to the decryption of the encryption key being completed, in operation 509, the security element 53 may transmit the temporal key to a security applet 55 of the second electronic device 530. The security applet 55 may be installed in an embedded secure element (eSE) of an NFC module (not shown). According to some embodiments, the security applet 55 may be installed in another construction (e.g., a SIM card).

In operation 511, the security applet 55 of an embodiment of the disclosure may store the temporal key. The temporal key may include identification information of an electronic key, a credential, a type of the credential (or the electronic key), an expiration time, and/or the number of times of limit. According to some embodiments, the security applet 55 may further store the (actual) number of times of use of the temporal key.

Figure 5B:
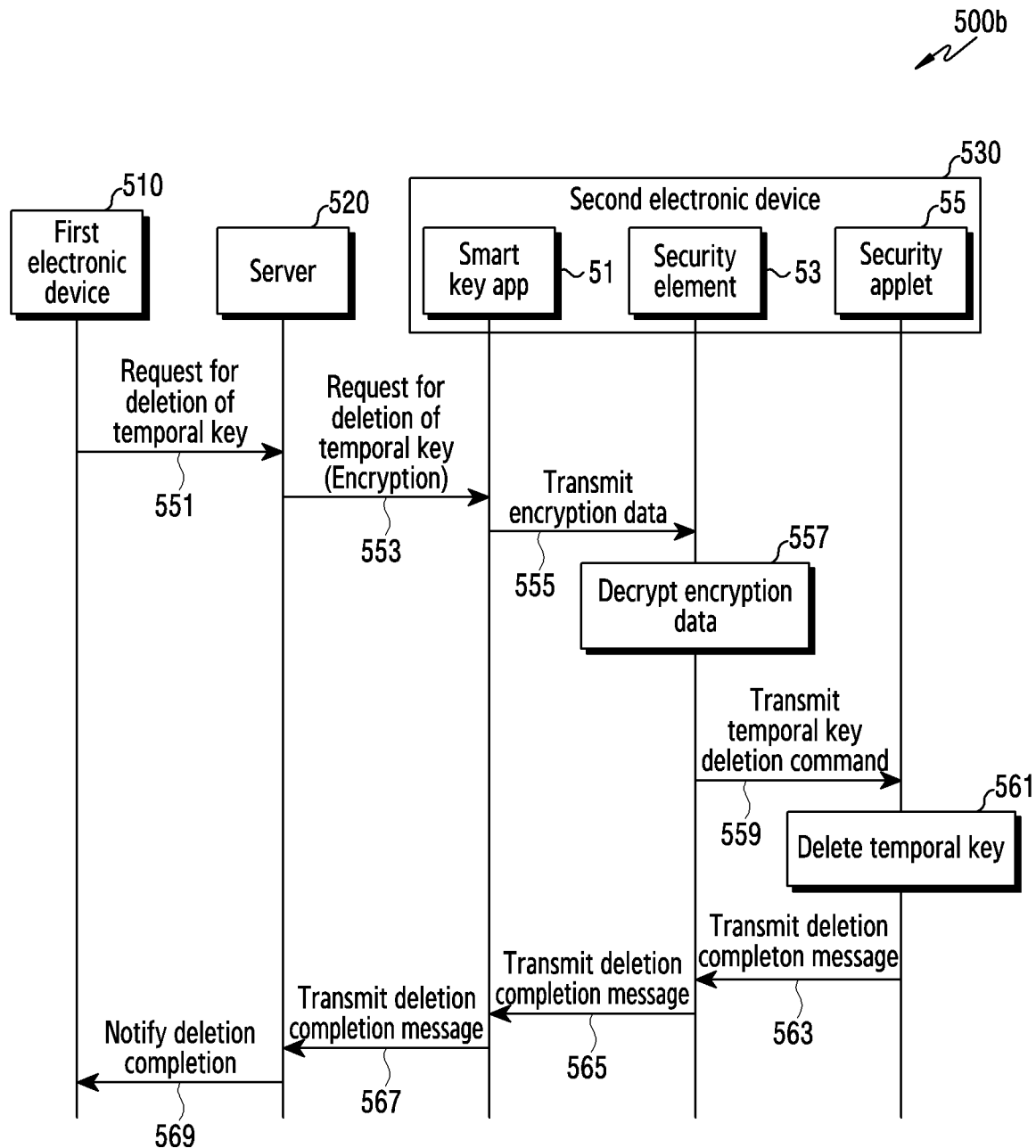
FIG. 5B is a flowchart illustrating an example procedure of deleting an electronic key according to an embodiment of the disclosure.

FIG. 5B is a flowchart illustrating an example procedure of deleting an electronic key according to an embodiment of the disclosure.

Referring to the flowchart 500b of FIG. 5B, in operation 551, the first electronic device 510 (e.g., the first electronic device 10 of FIG. 1 or the electronic device 201 of FIG. 2) of an embodiment of the disclosure may transmit a request for deletion of an electronic key (below, a temporal key) including credential information of limited use capable of temporally controlling a specific door lock (not shown) (e.g., the door lock 40 of FIG. 1 or the door lock 406 of FIG. 4), to the server 520 (e.g., the server 20 of FIG. 1, the server 208 of FIG. 2, the server 308 of FIG. 3, or the server 408 of FIG. 4). For example, the deletion request may include identification information (e.g., phone number) of the second electronic device 530 (e.g., the second electronic device 30 of FIG. 1 or the electronic device 204 of FIG. 2) and identification information of the temporal key. According to some embodiments, the first electronic device 510 may transmit only identification information about at least some temporal keys intended to be deleted among a plurality of temporal keys distributed to the second electronic device 530, to the server 520.

In response to the deletion request being received, or an authority of the temporal key expiring, in operation 553, the server 520 of an embodiment of the disclosure may transmit a request for deletion of the temporal key to the smart key App 51 of the second electronic device 530. The deletion request may be encrypted and transmitted, wherein the deletion request is able to be decrypted only by the security element 53.

In operation 555, the smart key App 51 of the second electronic device 530 of an embodiment of the disclosure may transmit the encrypted deletion request (e.g., encryption data) to the security element 53.

In operation 557, the security element 53 of the second electronic device 530 of an embodiment of the disclosure may decrypt the encryption data. In response to the decryption being completed, in operation 559, the security element 53 may transmit a command of deletion of the temporal key to the security applet 55 of the second electronic device 530.

In operation 561, the security applet 55 of an embodiment of the disclosure may delete the temporal key. In operation 563, the security applet 55 of an embodiment of the disclosure may transmit a message of deletion completion of the temporal key to the security element 53.

In operation 565, the security element 53 of an embodiment of the disclosure may transmit a message of deletion completion of the temporal key to the smart key App 51. At this time, the security element 53 may encrypt the deletion completion message in various schemes and transmit the encrypted deletion completion message to the smart key App 51. For example, the security element 53 may encrypt the deletion completion message using a first public key previously appointed (or defined) with the server 520.

In operation 567, the smart key App 51 of an embodiment of the disclosure may transmit the deletion completion message which is encrypted using the first public key, to the server 520. In operation 569, the server 520 of an embodiment of the disclosure may notify the deletion completion to the first electronic device 510. For example, the server 520 may decrypt an encrypted deletion message using a first private key corresponding to the first public key and identify that it is a deletion completion message, and may encrypt the deletion completion message by a second public key previously appointed with the first electronic device 510 and transmit the encrypted deletion completion message to the first electronic device 510. The first electronic device 510 may decrypt the deletion completion message using a second private key corresponding to the second public key.

Figure 6:
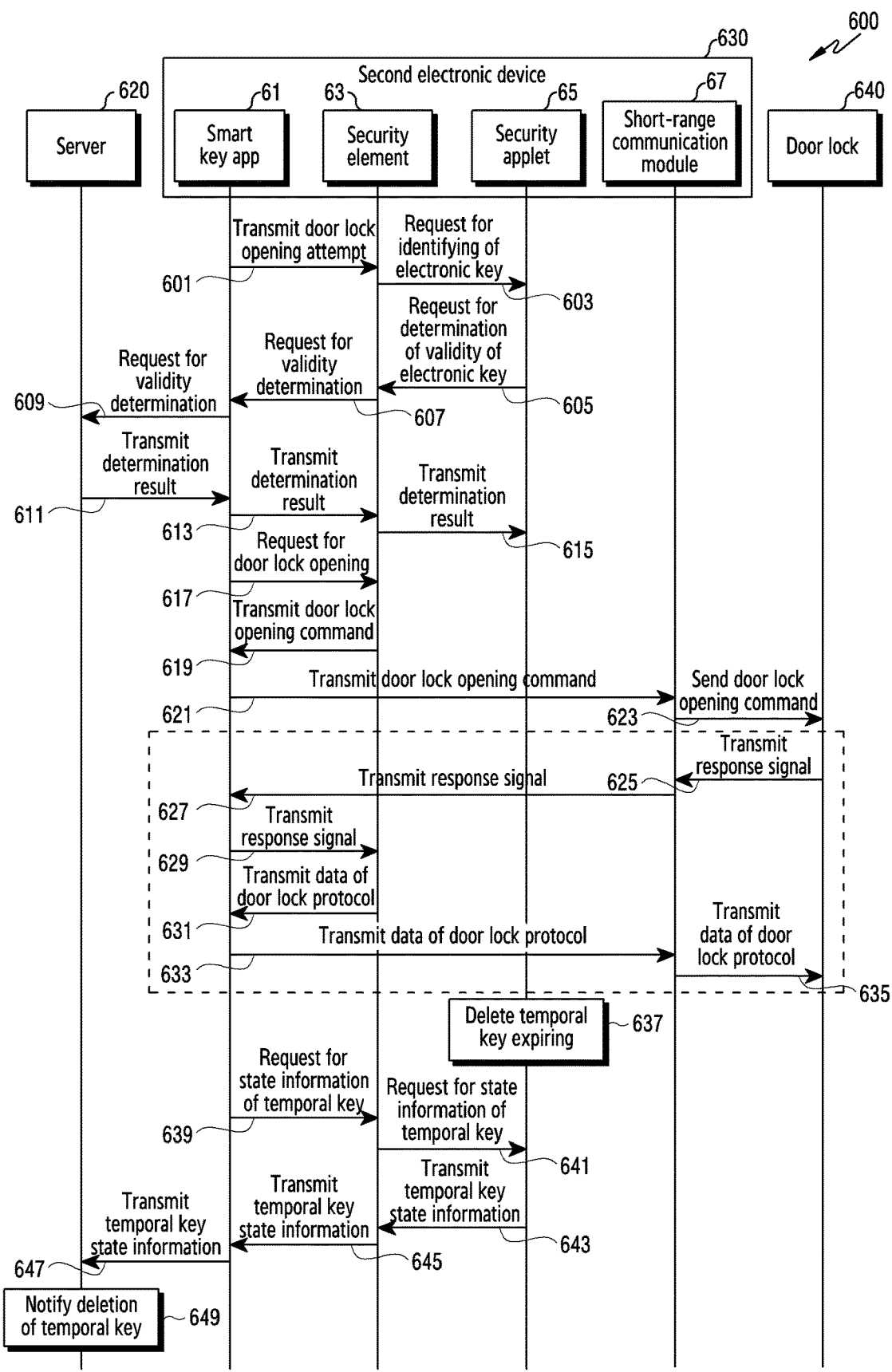
FIG. 6 is a flowchart illustrating an example procedure of controlling a door lock using an electronic key in response to communication with a server being available according to an embodiment of the disclosure.

FIG. 6 is a flowchart illustrating an example procedure of controlling a door lock using an electronic key in response to communication with a server being available according to an embodiment of the disclosure.

Referring to the flowchart 600 of FIG. 6, in operation 601, a smart key App 61 (e.g., the smart key App 51) of a second electronic device 630 (e.g., the second electronic device 30 of FIG. 1, the electronic device 204 of FIG. 2, or the second electronic device 530 of FIG. 5A and FIG. 5B) may transmit an opening attempt for a door lock 640 (e.g., the door lock 40 of FIG. 1 or the door lock 406 of FIG. 4) to a security element 63 (e.g., the security element 53). For example, in response to a user of the second electronic device 630 running the smart key App 61 and selecting an electronic key for releasing the door lock 640, the smart key App 61 may transmit that the opening attempt for the door lock 640 has been sensed, to the security element 63.

In operation 603, the security element 63 of an embodiment of the disclosure may send a request for identifying of an electronic key to a security applet 65.

In operation 605, the security applet 65 of an embodiment of the disclosure may transmit a request for determination of the validity of a temporal key to the security element 63. For example, the security applet 65 may identify the type of the electronic key and, in response to it being an electronic key (e.g., a temporal key) including a credential of limited use, the security applet 65 may transmit a message of requesting the determination of the validity of the temporal key, to the security element 63.

In operation 607, the security element 63 of an embodiment of the disclosure may transmit the validity determination request to the smart key App 61. For example, the security element 63 may encrypt the validity determination request and transmit the encrypted validity determination request to the smart key App 61.

In operation 609, the smart key App 61 of an embodiment of the disclosure may transmit the validity determination request to the server 620 (e.g., the server 20 of FIG. 1, the server 208 of FIG. 2, the server 308 of FIG. 3, the server 408 of FIG. 4, or the server 520 of FIG. 5).

In operation 611, the server 620 of an embodiment of the disclosure may transmit a result of validity determination to the smart key App 61. For example, the server 620 may identify whether a use period of a temporal key has been elapsed or identify whether an actual number of times of use of the temporal key exceeds a given (or limited) number of times, and transmit its result to the smart key App 61.

In operation 613, the smart key App 61 of an embodiment of the disclosure may transmit the validity determination result to the security element 63. In operation 615, the security element 63 of an embodiment of the disclosure may transmit the validity determination result to the security applet 65.

In operation 617, in response to the temporal key being valid, the smart key App 61 of an embodiment of the disclosure may transmit a request for sending of a door lock opening signal to the security element 63.

In operation 619, the security element 63 of an embodiment of the disclosure may provide a command of opening of the door lock 640, and transmit the provided opening command to the smart key App 61. The opening command may include a credential.

In operation 621 and operation 623, the smart key App 61 of an embodiment of the disclosure may send the door lock opening command to the door lock 640 through a short-range communication module 67. The short-range communication module 67 may, for example, and without limitation, be one of MST, BT, or BLE.

In operation 625 and operation 627, the door lock 640 of an embodiment of the disclosure may transmit a response signal to the smart key App 61 via the short-range communication module 67. The response signal may include an opening success or failure of a door lock. For example, the door lock 640 may compare a credential received from the smart key App 61 of the second electronic device 630 and a credential stored in a memory. In response to being consistent, the door lock 640 may be open. In response to being inconsistent, the door lock 640 may transmit a failure message to the smart key App 61 of the second electronic device 630.

In operation 629, the smart key App 61 of an embodiment of the disclosure may transmit a response signal to the security element 63. In operation 631, the security element 63 of an embodiment of the disclosure may provide data (e.g., an ACK signal for the response signal) according to a set protocol, and transmit the provided data to the smart key App 61.

In operation 633 and operation 635, the smart key App 61 of an embodiment of the disclosure may transmit the data to the door lock 640 via the short-range communication module 67. Operation 619 to operation 635 may be repeated until the set protocol is completed. For example, operation 619 to operation 635 may be repeated until the door lock is open or fails by a given number of times or more.

According to some embodiments, operation 625 to operation 635 may be omitted. For example, in response to sending an opening signal for the door lock 640 through MST supporting one-way communication, operation 625 to operation 635 may be omitted.

In operation 637, the security applet 65 of an embodiment of the disclosure may delete the temporal key. For example, in operation 615, in response to receiving the determination result that the temporal key is not valid, the security applet 65 may delete the temporal key.

In operation 639 to operation 641, the smart key App 61 of an embodiment of the disclosure may send a request for state information of the temporal key to the security applet 65 via the security element 63. For example, the smart key App 61 may periodically send the request for the state information of the temporal key to the security element 63 in operation 639. The security element 63 may provide the request for state information to the security applet 65 in operation 641.

In operation 643, the security applet 65 of an embodiment of the disclosure may transmit state information (e.g., deletion or non-deletion) of temporal keys to the security element 63.

In operation 645, the security element 63 of an embodiment of the disclosure may provide and encrypt state data of the temporal key, and transmit the encrypted state data to the smart key App 61.

In operation 647, the smart key App 61 of an embodiment of the disclosure may transmit the encrypted state data of the temporal key to the server 620.

In operation 649, the server 620 of an embodiment of the disclosure may notify that the temporal key has been deleted to a first electronic device (not shown). For example, the server 620 may notify, by a push message, the deletion of the temporal key to the first electronic device.

Figure 7A:
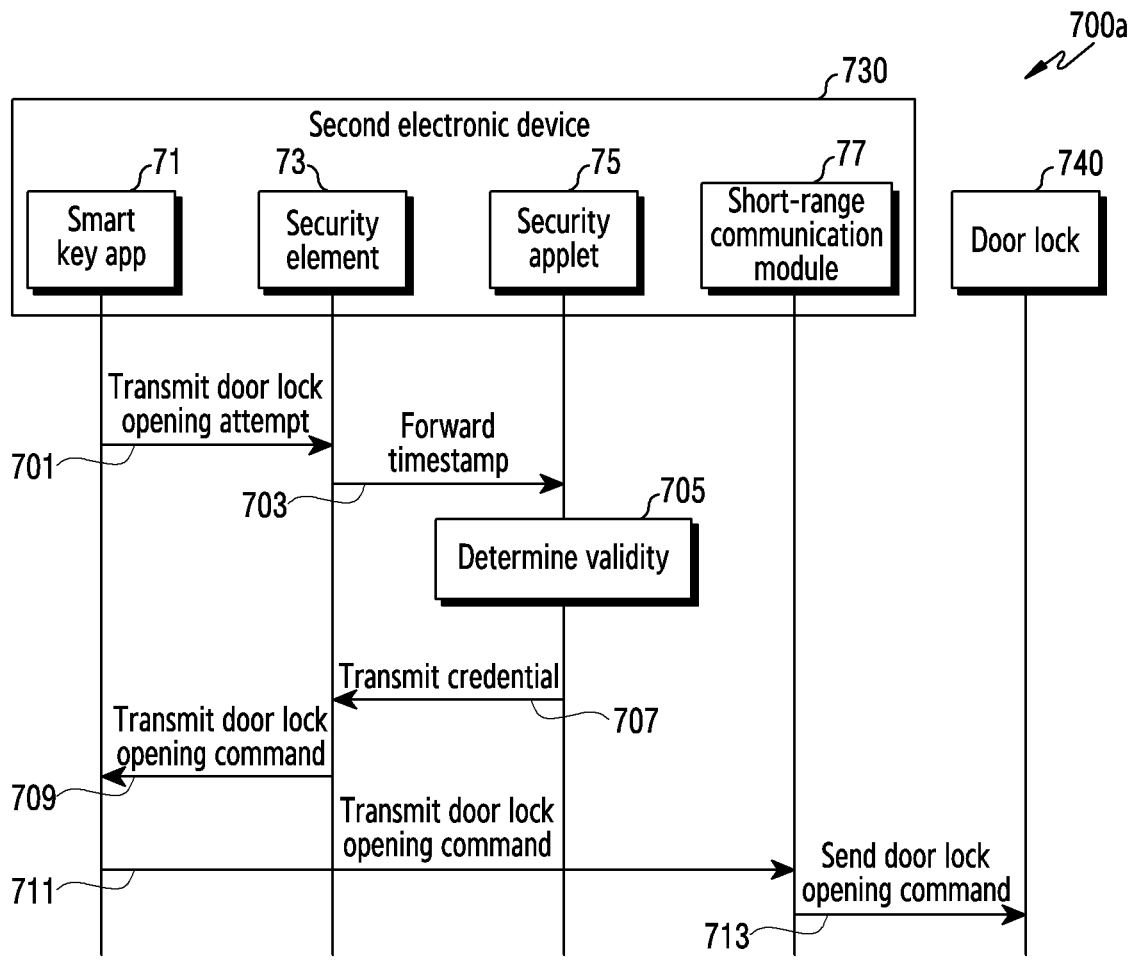
FIG. 7A is a flowchart illustrating an example procedure of controlling a door lock using an electronic key in response to communication with a server being unstable according to an embodiment of the disclosure.

FIG. 7A is a flowchart illustrating an example procedure of controlling a door lock using an electronic key in response to communication with a server being unstable according to an embodiment of the disclosure.

Referring to the flowchart 700a of FIG. 7A, a smart key App 71 of a second electronic device 730 (e.g., the second electronic device 30 of FIG. 1, the electronic device 204 of FIG. 2, or the second electronic device 530 of FIG. 5A and FIG. 5B) may, in operation 701, transmit an opening attempt for a door lock 740 (e.g., the door lock 40 of FIG. 1 or the door lock 406 of FIG. 4) to a security element 73 (e.g., the security element 53). For example, in response to a user of the second electronic device 730 running the smart key App 71, and selecting an electronic key for releasing the door lock 740 (e.g., an electronic key including credential information of limited use) (below, a temporal key), the smart key App 71 may transmit that the opening attempt for the door lock 740 has been sensed, to the security element 73.

In operation 703, the security element 73 of an embodiment of the disclosure may forward a timestamp to the security applet 75. In operation 705, the security applet 75 of an embodiment of the disclosure may determine the validity of the temporal key. For example, the security applet 75 may compare an expiration time included in the temporal key and the timestamp, to determine the validity of the temporal key.

In response to the temporal key being valid, in operation 707, the security applet 75 of an embodiment of the disclosure may transmit a credential included in the temporal key to the security element 73. In operation 709, the security element 73 of an embodiment of the disclosure may provide a command of opening of the door lock 740, and transmit the provided command to the smart key App 71. For example, the security element 73 may transmit a door lock opening command including a credential to the smart key App 71.

In operation 711 and operation 713, the smart key App 71 of an embodiment of the disclosure may send the door lock opening command to the door lock 740 via a short-range communication module 77. The short-range communication module 77 may, for example, and without limitation, be one of MST, BT, or BLE.

Subsequent operations are the same as operation 625 to operation 649 of FIG. 6. A detailed description will not be repeated here.

According to some embodiments, the security applet 75 may store an actual number of times of use of a temporal key, and compare a stored number of times and a given number of times of limit, to determine the validity of the temporal key. According to another embodiment, in response to opening of a door lock being completed using the temporal key, the security applet 75 may correct the number of times of limit in a count-down scheme. In response to the number of times of limit being equal to or being greater than "1", the security applet 75 may identify that it is valid. In response to the number of times of limit being equal to "0", the security applet 75 may identify that it is not valid and delete the temporal key. According to another embodiment, the security applet 75 may use a count-up scheme. For example, the security applet 75 may count up an (actual) number of times of use of a temporal key after use of the temporal key. In response to the number of times of use being made equal to the number of times of limit, the security applet 75 may delete the temporal key.

Figure 7B:
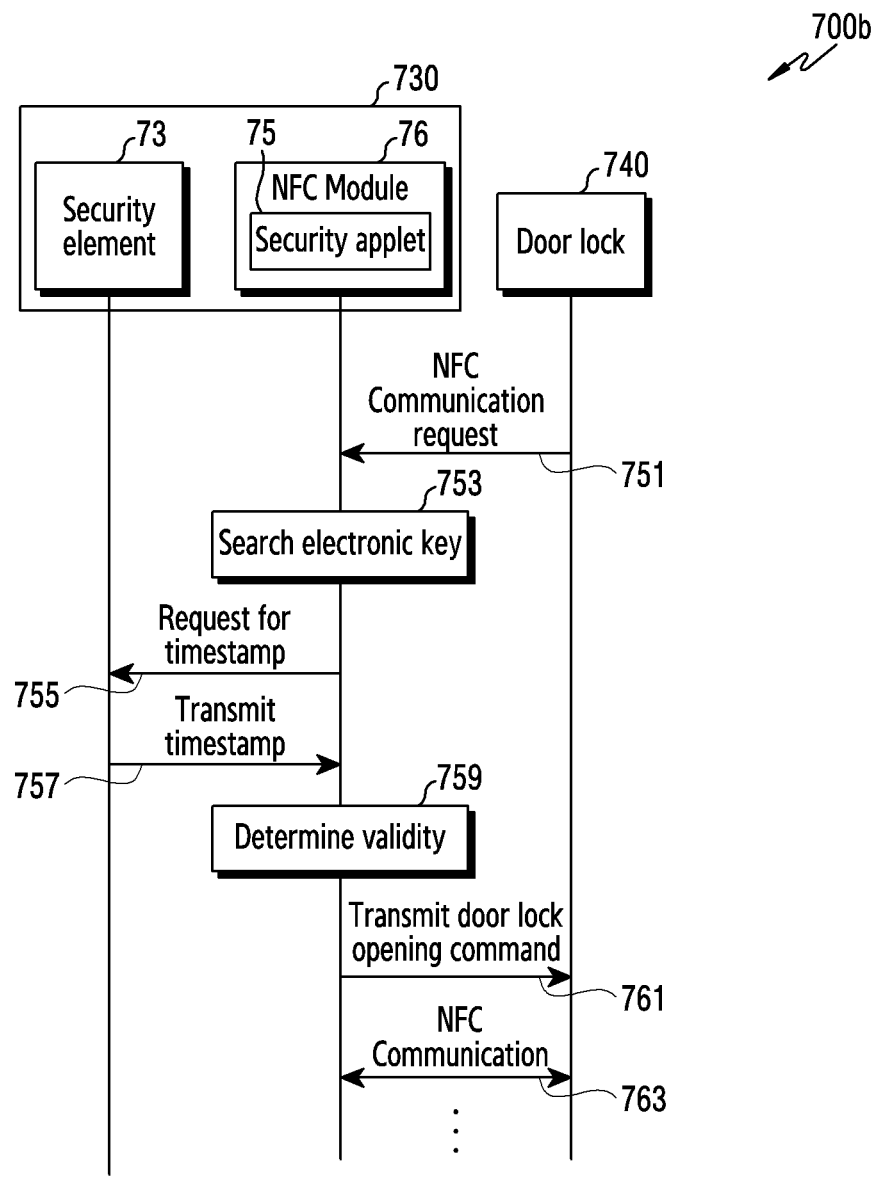
FIG. 7B is a flowchart illustrating an example procedure of controlling a door lock using an electronic key in response to communication with a server being unstable according to an embodiment of the disclosure.

FIG. 7B is a flowchart illustrating an example procedure of controlling a door lock using an electronic key in response to communication with a server being unstable according to an embodiment of the disclosure.

Referring to the flowchart 700b of FIG. 7B, in operation 751, in response to sensing that the second electronic device 730 approaches, the door lock 740 of an embodiment of the disclosure may request for NFC communication.

In response to the NFC communication being initiated, in operation 753, the security applet 75 installed in an NFC module 76 of the second electronic device 730 of an embodiment of the disclosure may search an electronic key. For example, the security applet 75 may receive application identification information (e.g., application identification (AID)) from the door lock 740, and search an electronic key corresponding to the AID.

In operation 755, the security applet 75 of the second electronic device 730 of an embodiment of the disclosure may request a timestamp to the security element 73. For example, in response to the searched electronic key being an electronic key (e.g., a temporal key) including a credential of limited use, the security applet 75 may send a request for a timestamp to the security element 73.

In operation 757, the security element 73 of an embodiment of the disclosure may forward the timestamp to the security applet 75. In operation 759, the security applet 75 of an embodiment of the disclosure may determine the validity of the temporal key, at least partially based on the timestamp. For example, the security applet 75 may compare the expiration time included in the temporal key and the timestamp, to determine the validity of the temporal key.

In response to the temporal key being valid, in operation 761, the security applet 75 of an embodiment of the disclosure may provide a command of opening of the door lock 740 based on the credential included in the temporal key, and transmit the provided command to the door lock 740. The opening command may be transmitted to the door lock 740 through the NFC module 76.

In operation 763, the security applet 75 and the door lock 740 of an embodiment of the disclosure may perform communication according to the standard of an NFC communication protocol. Subsequent operations are similar with FIG. 6 and FIG. 7A except for using the NFC communication and thus, a detailed description thereof will not be repeated here.

Even in response to not capable of determining the validity of a temporal key through a server because communication with the server is unstable, the aforementioned embodiments of the disclosure of FIG. 7A and FIG. 7B may determine the validity of the temporal key using the timestamp of the security element for which manipulation (e.g., hacking) is impossible and thus, may safely manage the temporal key.

According to various embodiments of the disclosure, an electronic device (e.g., a second electronic device (30, 530, 630, 730), an electronic device (201)) may comprise a wireless communication circuit (e.g., communication module (290), a short-range communication module (67, 77)); a hardware-based security element including circuitry (e.g., a security element (53, 63, 73)) configured to provide a timestamp; a processor (e.g., a processor (220)) operatively coupled with the communication circuit and the security element; and a memory (e.g., a memory (230)) operatively coupled with the processor. The memory stores instructions that, when executed by the processor, control the electronic device to: launch an application related with an electronic key of a door lock (e.g., a door lock (40, 406, 640, 740)), receive an input (e.g., a user input) that uses the electronic key to open the door lock through the application, determine the validity of credential information related with the input based at least in part on the timestamp, and open the door lock based on the validity of the credential information.

According to various embodiments, the instructions, when executed by the processor, control the electronic device to determine the validity of the credential information using an embedded security element (eSE).

According to various embodiments, the instructions, when executed by the processor, control the electronic device to allow the eSE to check at least one of: the credential information, a key type, expiration information and a key use limit.

According to various embodiments, the instructions, when executed by the processor, control the electronic device to identify whether the electronic key is a temporal key comprising credential information of limited use and, determine the validity of the credential information in response to the electronic key being the temporal key.

According to various embodiments, the instructions, when executed by the processor, control the electronic device to identify whether a limit condition of the temporal key has expired, and delete the temporal key in response to the limit condition expiring.

According to various embodiments, the instructions, when executed by the processor, control the electronic device to notify the deletion of the temporal key to a previously given server managing the electronic key.

According to various embodiments, the instructions, when executed by the processor, control the electronic device to provide and transmit a command of opening of the door lock to the door lock in response to the credential information being valid, and delete the credential information in response to the credential information not being valid.

According to various embodiments, the instructions, when executed by the processor, control the electronic device to identify whether communication with a previously given server is available, send a request for determination of the validity of the credential information to the server in response to the communication with the server being available, receive the determination result, and determine the validity of the credential information based on the received determination result.

According to various embodiments of the disclosure, an electronic device (e.g., a second electronic device (30, 530, 630, 730), an electronic device (201)) may comprise a hardware-based security element (e.g., a security element (53, 63, 73)) comprising circuitry configured to provide a timestamp, a near field communication (NFC) communication circuit (e.g., a NFC module (76)), a processor (e.g., a processor (220)) operatively coupled with the communication circuit and the security element, and a memory (e.g., a memory (230)) operatively coupled with the processor. The memory stores instructions that, when executed by the processor, control the electronic device to: receive a request of transmission of an electronic key for opening of a door lock (e.g., a door lock (40, 406, 640, 740)) from the door lock through the communication circuit in response to approaching within a specific distance from the door lock, search an electronic key related with the door lock, determine the validity of credential information related with the searched electronic key based at least in part on the timestamp, and open the door lock based on the validity of the credential information.

According to various embodiments, the instructions, when executed by the processor, control the electronic device to search the electronic key using an embedded security element (eSE), and determine the validity of the credential information.

According to various embodiments of the disclosure, the instructions, when executed by the processor, control the electronic device to identify whether the searched electronic key is a temporal key comprising credential information of limited use, and determine the validity of the credential information in response to the searched electronic key being the temporal key.

According to various embodiments of the disclosure, the instructions, when executed by the processor, control the electronic device to provide and transmit a command of opening of the door lock to the door lock in response to the credential information being valid; and delete the credential information in response to the credential information not being valid.

Figure 8:
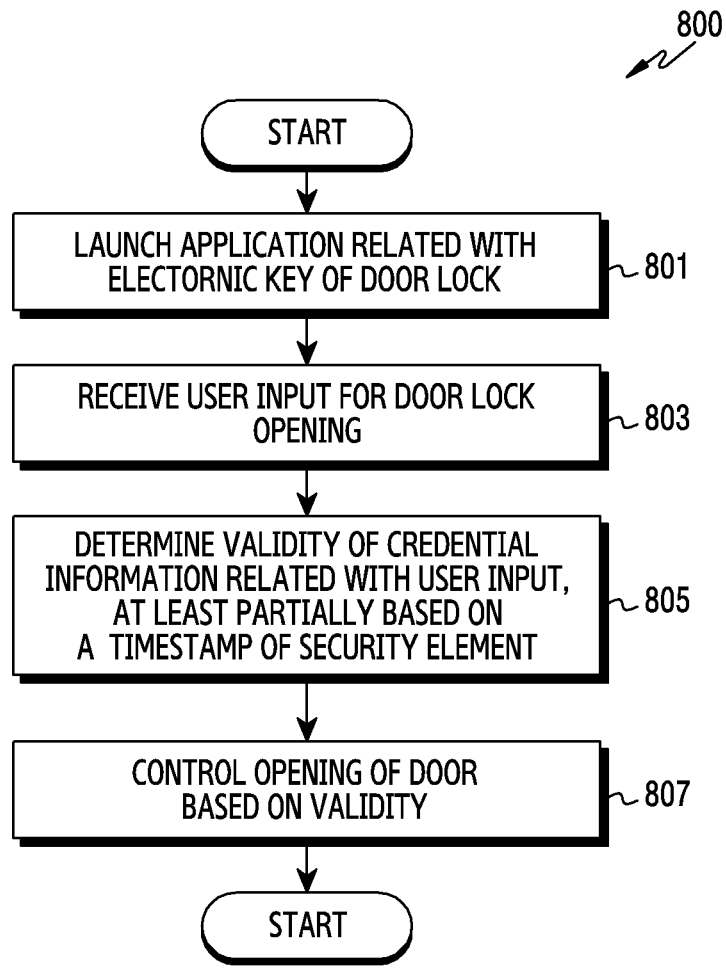
FIG. 8 is a flowchart illustrating an example method for managing an electronic key of an electronic device according to an embodiment of the disclosure.

FIG. 8 is a flowchart illustrating an example method for managing an electronic key of an electronic device according to an embodiment of the disclosure.

Referring to the flowchart 800 of FIG. 8, in operation 801, a processor (e.g., the processor 220 of FIG. 2) of an electronic device (e.g., the second electronic device 30 of FIG. 1, the electronic device 204 of FIG. 2, the second electronic device 530 of FIG. 5A and FIG. 5B, the second electronic device 630 of FIG. 6, or the second electronic device 730 of FIG. 7A) of an embodiment of the disclosure may launch an application (e.g., a smart key App) related with an electronic key of a door lock (e.g., the door lock 40 of FIG. 1, the door lock 406 of FIG. 4, the door lock 640 of FIG. 6, or the door lock 740 of FIG. 7A).

In operation 803, the processor of an embodiment of the disclosure may receive an input (e.g., a user input) for door lock opening. For example, the processor may run a smart key App, and receive a user input of selecting an electronic key (e.g., a temporal key) for door lock opening.

In operation 805, the processor of an embodiment of the disclosure may identify (determine) the validity of credential information related to the user input, at least partially based on a timestamp of a security element (e.g., the security element 53, the security element 63, or the security element 73). For example, the processor may identify the validity using an embedded security element (eSE). The eSE may check at least one of the credential information, a credential type, expiration information or the number of times of limit of credential use. The credential information may be a control key for opening a door lock. The credential type may include a normal type in which use is not limited and a limited type in which use is limited. The expiration information may be a time (e.g., a timestamp) capable of using a credential of the limited type. For example, in case where the expiration information is 3 o'clock p.m. of 15 Feb. 2018, in response to 3 o'clock p.m. of 15 Feb. 2018 being elapsed, the processor may delete the credential of the limited type. The number of times of limit may be the number of times capable of using the credential of the limited type. For example, in response to the number of times of limit being three times, the processor may count the number of times of use of the credential of the limited type, and delete the credential of the limited type after the credential of the limited type is used three times.

According to some embodiments, the processor may identify the type of an electronic key and, in response to the electronic key being an electronic key (below, a temporal key) including credential information of limited use, the processor may identify the validity of the temporal key.

In operation 807, the processor of an embodiment of the disclosure may control opening of a door based on the validity. For example, in response to being valid, the processor may transmit a door lock opening command to a door lock through a short-range communication module (e.g., NFC, BT, BLE, etc.). In response to not being valid, the processor may delete the electronic key.

According to some embodiments, the processor may notify the deletion of the electronic key to the other electronic device (e.g., the first electronic device 10 of FIG. 1, the electronic device 201 of FIG. 2, or the first electronic device 510 of FIG. 5A and FIG. 5B) through a server (e.g., the server 20 of FIG. 1, the server 208 of FIG. 2, the server 308 of FIG. 3, the server 408 of FIG. 4, the server 520 of FIG. 5A and FIG. 5B, or the server 620 of FIG. 6). According to some embodiments, in response to communication with the server being stabilized, the processor may transmit a notification of deletion of the electronic key to the other electronic device.

Figure 9:
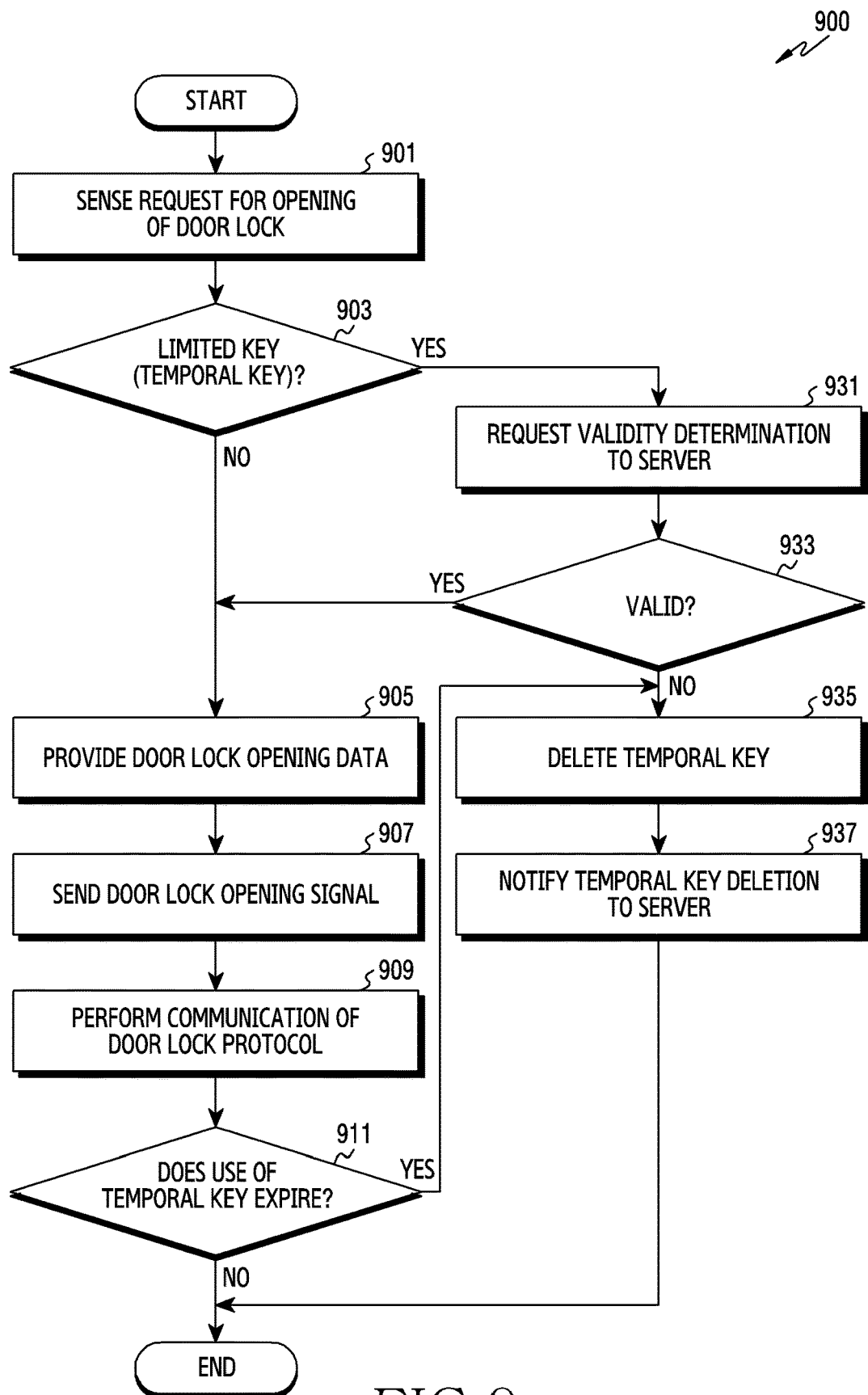
FIG. 9 is a flowchart illustrating an example method for managing an electronic key of an electronic device in response to communication with a server being available according to an embodiment of the disclosure.

FIG. 9 is a flowchart illustrating an example method for managing an electronic key of an electronic device in response to communication with a server being available according to an embodiment of the disclosure.

Referring to the flowchart 900 of FIG. 9, in operation 901, a processor (e.g., the processor 220 of FIG. 2) of an electronic device (e.g., the second electronic device 30 of FIG. 1, the electronic device 204 of FIG. 2, the second electronic device 530 of FIG. 5A and FIG. 5B, the second electronic device 630 of FIG. 6, or the second electronic device 730 of FIG. 7A) of an embodiment of the disclosure may sense a request for opening of a door lock (e.g., the door lock 40 of FIG. 1, the door lock 406 of FIG. 4, or the door lock 640 of FIG. 6). For example, in response to a user of the electronic device running a smart key App, and selecting an electronic key for releasing the door lock, the processor may recognize that it is a door lock opening request.

In operation 903, the processor of an embodiment of the disclosure may identify (determine) whether the selected key is an electronic key (e.g., a temporal key) including credential information of limited use. For example, the smart key App may send a request for identifying of the selected key to a security applet via a security element. The security applet may identify a key type (or a credential type), to identify whether the selected key is a temporal key.

In response to not being the temporal key as the identifying result of operation 903, in operation 905, the processor of an embodiment of the disclosure may provide opening data of the door lock. The opening data may be provided based on a credential stored in the security applet by the security element.

In operation 907, the processor of an embodiment of the disclosure may send a door lock opening signal. For example, the processor may send the door lock opening signal to the door lock through a communication module (e.g., MST, BT, or BLE).

In operation 909, the processor of an embodiment of the disclosure may perform communication of a door lock protocol. According to some embodiments, operation 909 may be omitted. For example, in response to sending the door lock opening signal to the door lock through MST, operation 909 may be omitted.

In response to being the temporal key as the identifying result of operation 903, in operation 931, the processor of an embodiment of the disclosure may send a request for determining of the validity of the temporal key to a server (e.g., the server 20 of FIG. 1, the server 208 of FIG. 2, the server 308 of FIG. 3, the server 408 of FIG. 4, or the server 620 of FIG. 6).

In operation 933, the processor of an embodiment of the disclosure may identify (determine) whether the temporal key is valid. For example, the processor may receive the identifying result from the server, and identify whether the temporal key is valid through the reception result.

In response to being valid as the identifying result of operation 933, the processor may proceed to operation 905. On the other hand, in response to being invalid as the identifying result of operation 933, in operation 935, the processor may delete the temporal key.

In operation 937, the processor of an embodiment of the disclosure may notify the deletion of the temporal key to the server. According to some embodiments, the server may notify the deletion of the temporal key to the other electronic device (e.g., the first electronic device) having distributed the temporal key.

In response to the control (opening or failure) of the door lock being completed, in operation 911, the processor of an embodiment of the disclosure may identify whether the use of the temporal key has expired. The expiration of the temporal key use may be identified periodically by the security applet. For example, the security applet may compare a limit period being set to the temporal key and a timestamp received from the server, to identify whether the temporal key use has expired.

In response to the temporal key use not having expired as the identifying result of operation 911, the processor may terminate a door opening operation. In response to the temporal key being expired as the identifying result of operation 911, the processor may proceed to operation 935.

Figure 10A:
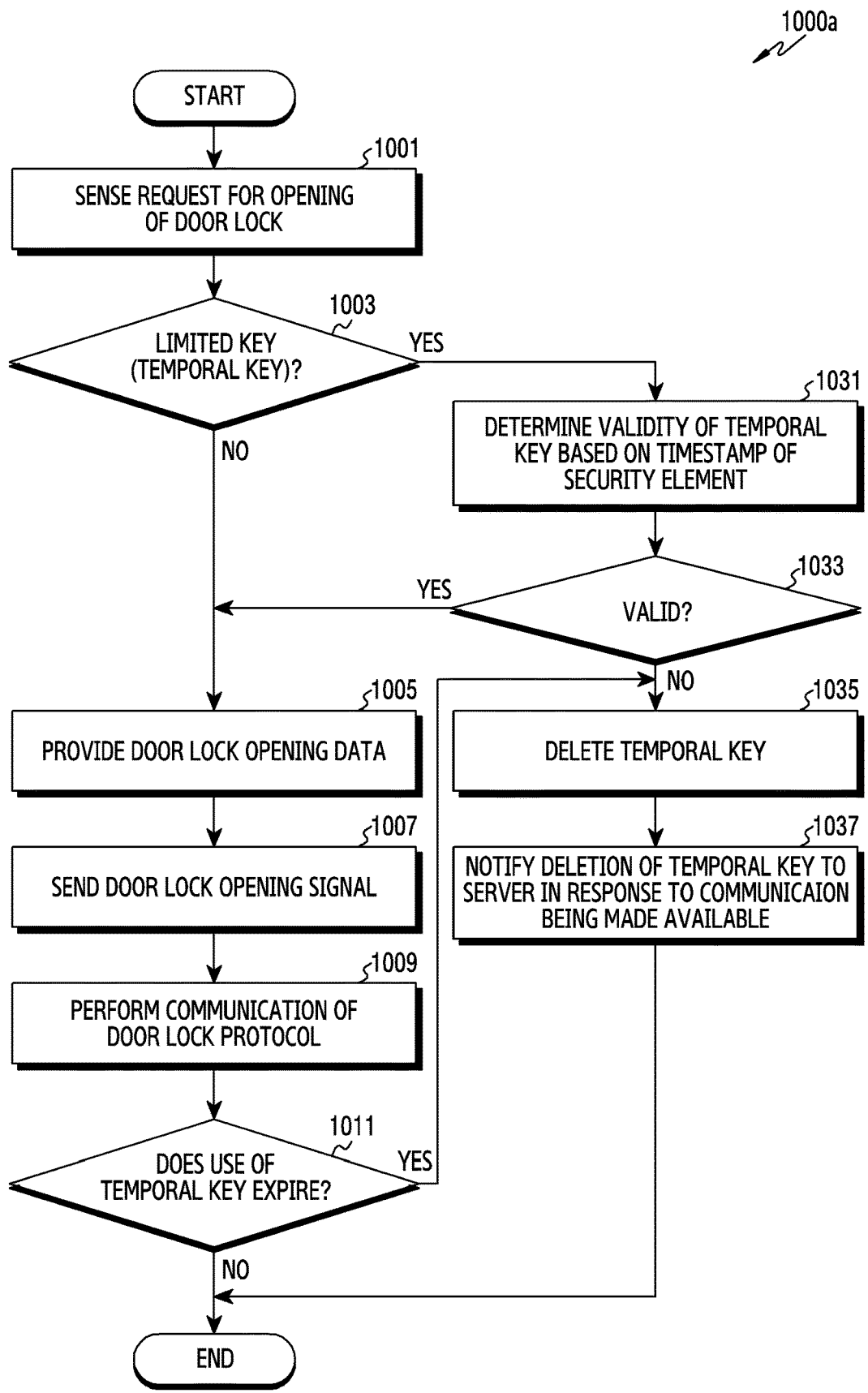
FIG. 10A is a flowchart illustrating an example method for managing an electronic key of an electronic device in response to communication with a server being unstable according to an embodiment of the disclosure.

FIG. 10A is a flowchart illustrating an example method for managing an electronic key of an electronic device in response to communication with a server being unstable according to an embodiment of the disclosure.

Referring to the flowchart 1000*a* of FIG. 10A, in operation 1001, a processor (e.g., the processor 220 of FIG. 2) of the electronic device (e.g., the second electronic device 30 of FIG. 1, the electronic device 204 of FIG. 2, the second electronic device 530 of FIG. 5A and FIG. 5B, or the second electronic device 730 of FIG. 7A) of an embodiment of the disclosure may sense a request for opening of a door lock (e.g., the door lock 40 of FIG. 1, the door lock 406 of FIG. 4, or the door lock 740 of FIG. 7). For example, in response to a user of the electronic device running a smart key App, and selecting an electronic key for releasing the door lock, the processor may recognize that it is a door lock opening request.

In operation 1003, the processor of an embodiment of the disclosure may identify (determine) whether the selected key is an electronic key (e.g., a temporal key) including credential information of limited use. For example, the smart key App may send a request for identifying of the selected electronic key type to a security applet (e.g., the security applet 55 of FIG. 5A and FIG. 5B or the security applet 75 of FIG. 7A) through a security element (e.g., the security element 53 of FIG. 5A and FIG. 5B, or the security element 73 of FIG. 7A). The security applet may identify an electronic key type (or credential type), to identify whether the selected key is the temporal key.

In response to not being the temporal key as the identifying result of operation 1003, in operation 1005, the processor of an embodiment of the disclosure may provide opening data of the door lock. The opening data may be provided based on a credential stored in the security applet by the security element.

In operation 1007, the processor of an embodiment of the disclosure may send a door lock opening signal. For example, the smart key App may send the door lock opening signal to the door lock via a communication module (e.g., MST, BT, or BLE).

In operation 1009, the processor of an embodiment of the disclosure may perform communication of a door lock protocol. According to some embodiments, operation 1009 may be omitted. For example, in response to sending the door lock opening signal to the door lock through MST, operation 1009 may be omitted.

In response to being the temporal key as the identifying result of operation 1003, in operation 1031, the processor of an embodiment of the disclosure may determine the validity of the temporal key based on a timestamp of the security element. For example, the security applet may compare the timestamp provided from the security element and a limit period included in the temporal key, to determine the validity of the temporal key.

In operation 1033, the processor of an embodiment of the disclosure may identify (determine) whether the temporal key is valid. In response to being valid as the identifying result of operation 1033, the processor may proceed to operation 1005. On the other hand, in response to being invalid as the identifying result of operation 1033, in operation 1035, the processor may delete the temporal key.

In operation 1037, the processor of an embodiment of the disclosure may notify the deletion of the temporal key to a server (e.g., the server 20 of FIG. 1, the server 203 of FIG. 2, the server 308 of FIG. 3, the server 408 of FIG. 4, or the server 520 of FIG. 5A and FIG. 5B). For example, in response to communication with the server being made available, the processor may notify the deletion of the temporal key to the server. The server may notify the deletion of the temporal key to the other electronic device (e.g., the first electronic device) having distributed the temporal key.

In response to control (opening or failure) of the door lock being completed, in operation 1011, the processor of an embodiment of the disclosure may identify whether the use of the temporal key has expired. The expiration of the temporal key use may be identified periodically by the security applet. For example, the security applet may compare a timestamp received from the security element and a limit period of the temporal key, to identify whether the key use has expired.

In response to the temporal key use being expired as the identifying result of operation 1011, the processor may proceed to operation 1035. On the other hand, in response to the temporal key use not having expired as the identifying result of operation 1011, the processor may terminate a door opening operation.

Figure 10B:
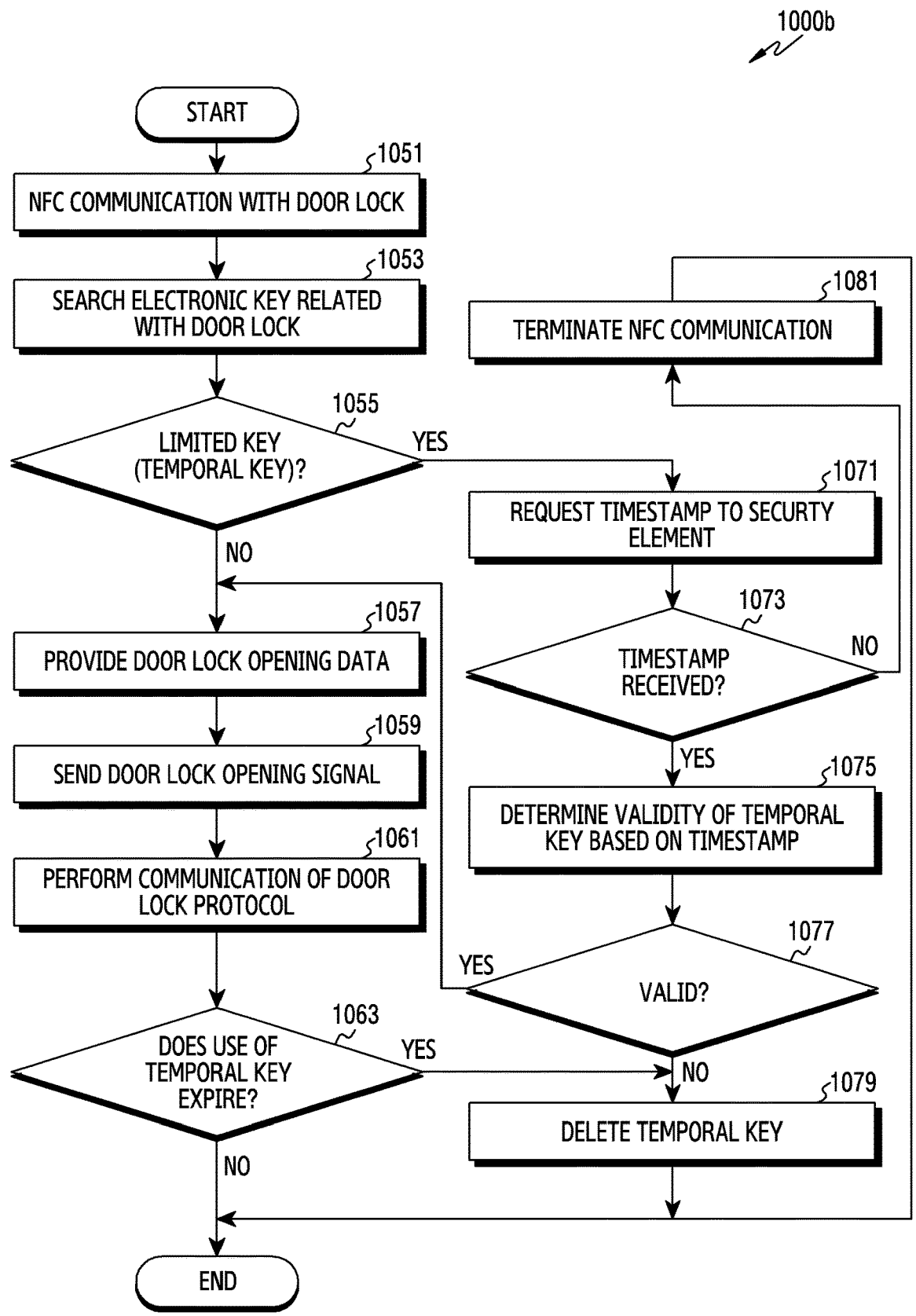
FIG. 10B is a flowchart illustrating an example method for managing an electronic key of an electronic device in response to communication with a server being unstable according to an embodiment of the disclosure.

FIG. 10B is a flowchart illustrating an example method for managing an electronic key of an electronic device in response to communication with a server being unstable according to an embodiment of the disclosure.

Referring to the flowchart 1000*b* of FIG. 10B, in operation 1051, an electronic device (e.g., the second electronic device 30 of FIG. 1, the electronic device 204 of FIG. 2, the second electronic device 530 of FIG. 5A and FIG. 5B, or the second electronic device 730 of FIG. 7B) of an embodiment of the disclosure may perform NFC communication with a door lock (e.g., the door lock 40 of FIG. 1, the door lock 406 of FIG. 4, or the door lock 740 of FIG. 7B). For example, in response to the electronic device approaching within a specific distance with the door lock, a security applet (e.g., the security applet 75 of FIG. 7B) installed in an NFC module (e.g., the NFC module 76 of FIG. 7B) of the electronic device is activated, to receive a request for transmission of an electronic key for opening of the door lock.

In operation 1053, the processor of an embodiment of the disclosure may search an electronic key related with the door lock. For example, using the security applet, the processor may search an electronic key corresponding to application identification information (application identification (AID)) received from the door lock.

In operation 1055, the processor of an embodiment of the disclosure may identify (determine) whether the searched key is an electronic key (below, a temporal key) including credential information of limited use. The processor may identify whether the searched electronic key is a temporal key using the security applet.

In response to not being the temporal key as the identifying result of operation 1055, in operation 1057, the processor of an embodiment of the disclosure may provide opening data of the door lock. The opening data may be provided based on a credential stored in the security applet by the security element.

In operation 1059, the processor of an embodiment of the disclosure may send a door lock opening signal. For example, the processor may send the door lock opening signal to the door lock via an NFC module (e.g., the NFC module 76 of FIG. 7B).

In operation 1061, the processor of an embodiment of the disclosure may perform communication of a door lock protocol.

In response to being the temporal key as the identifying result of operation 1055, in operation 1071, the processor of an embodiment of the disclosure may send a request for a timestamp to the security element. For example, the processor may send the request for the timestamp to the security element using the security applet.

In operation 1073, the processor of an embodiment of the disclosure may identify (determine) whether the timestamp is received. For example, using the security applet, the processor may identify whether the timestamp is received. In response to the timestamp not being received as the identifying result of operation 1073, in operation 1081, the processor may terminate the NFC communication. On the other hand, in response to the timestamp being received as the identifying result of operation 1073, in operation 1075, the processor may determine the validity of the temporal key based on the received timestamp. For example, using the security applet, the processor may compare the timestamp of the security element and a limit period included in the temporal key, to determine the validity.

In operation 1077, the processor of an embodiment of the disclosure may determine (or identify) whether the temporal key is valid. For example, the processor may identify whether the temporal key is valid using the security applet.

In response to being valid as the identifying result of operation 1077, the processor may proceed to operation 1057. On the other hand, in response to being invalid as the identifying result of operation 1077, in operation 1079, the processor may delete the temporal key.

According to some embodiments, the processor may periodically identify a state (e.g., deletion or non-deletion) of the electronic key. In response to communication with the server being made available, the processor may notify a state of the electronic key (e.g., deletion of the temporal key) to the server. At this time, the server may notify the deletion of the temporal key to the other electronic device (e.g., the first electronic device) having distributed the temporal key.

In response to the control (opening or failure) of the door lock being completed, in operation 1063, the processor of an embodiment of the disclosure may identify whether the use of the temporal key has expired. The expiration of the temporal key use may be identified periodically by the security applet. For example, the security applet may compare a timestamp received from the security element and a limit period of the temporal key, to identify whether the key use has expired.

In response to the use of the temporal key being expired as the identifying result of operation 1063, the processor (e.g., the security applet) may proceed to operation 1079. On the other hand, in response to the use of the temporal key not having expired as the identifying result of operation 1063, the processor may terminate a door opening operation.

Figure 11:
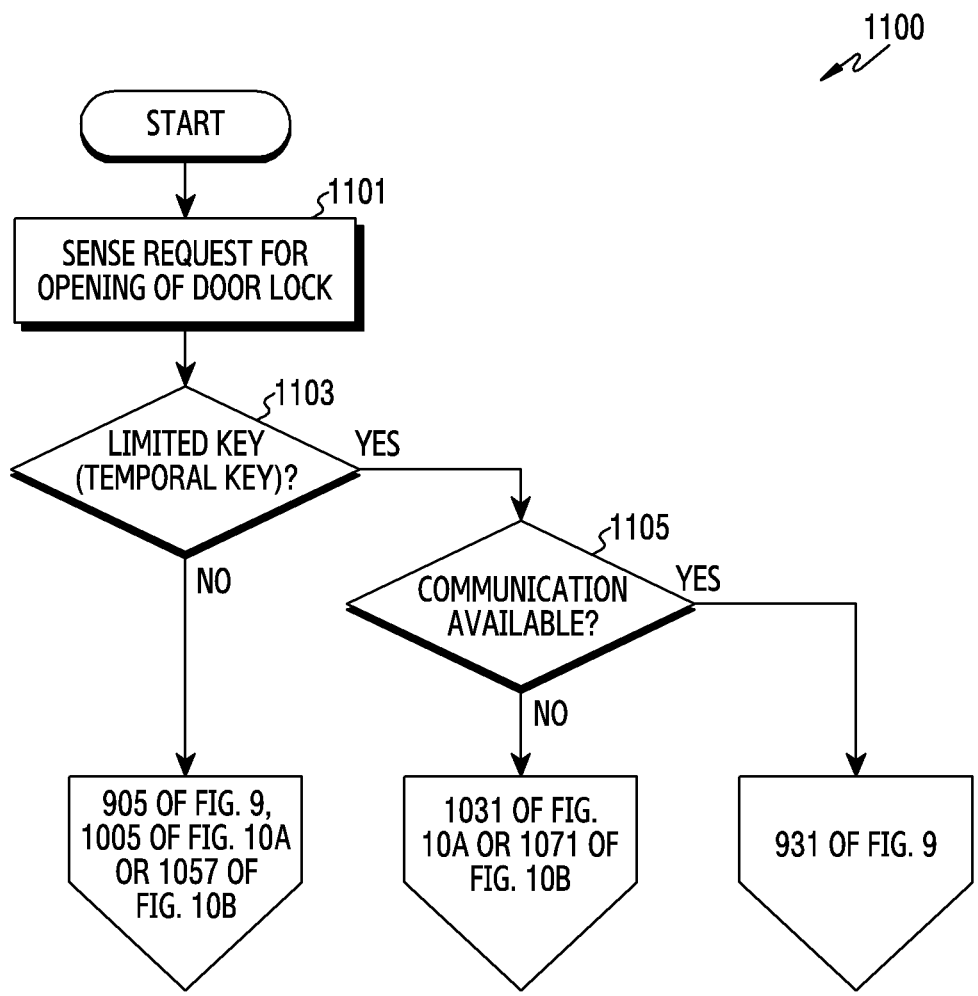
FIG. 11 is a flowchart illustrating an example method for managing an electronic key of an electronic device according to an embodiment of the disclosure.

FIG. 11 is a flowchart illustrating an example method for managing an electronic key of an electronic device according to an embodiment of the disclosure.

Referring to the flowchart 1100 of FIG. 11, in operation 1101, a processor (e.g., the processor 220 of FIG. 2) of an electronic device (e.g., the second electronic device 30 of FIG. 1, the electronic device 204 of FIG. 2, the second electronic device 530 of FIG. 5A and FIG. 5B, the second electronic device 630 of FIG. 6, or the second electronic device 730 of FIG. 7A and FIG. 7B) of an embodiment of the disclosure may sense a request for opening of a door lock (e.g., the door lock 40 of FIG. 1, the door lock 406 of FIG. 4, the door lock 640 of FIG. 6, or the door lock 740 of FIG. 7A and FIG. 7B). For example, in response to a user of the electronic device running a smart key App, and selecting an electronic key for releasing the door lock, the processor may recognize that it is a door lock opening request. The processor may receive the door lock opening request from the door lock via an NFC module (e.g., the NFC module 76 of FIG. 7B).

In operation 1103, the processor of an embodiment of the disclosure may identify (determine) whether the selected electronic key is an electronic key (e.g., a temporal key) including credential information of limited use. For example, the smart key App may send a request for identifying whether the selected key is the temporal key to a security applet through a security element. The security applet may identify an electronic key type (or a credential type), to identify whether the electronic key type is a temporal key.

In response to not being the temporal key as the identifying result of operation 1103, the processor of an embodiment of the disclosure may proceed to operation 905 of FIG. 9, operation 1005 of FIG. 10A, or operation 1057 of FIG. 10B. On the other hand, in response to being the temporal key as the identifying result of operation 1103, in operation 1105, the processor of an embodiment of the disclosure may identify (determine) whether communication with a server (e.g., the server 20 of FIG. 1, the server 208 of FIG. 2, the server 308 of FIG. 3, the server 408 of FIG. 4, or the server 620 of FIG. 6) is available.

In response to the communication being available as the identifying result of operation 1105, the processor may proceed to operation 931 of FIG. 9. On the other hand, in response to the communication being unstable or unavailable as the identifying result of operation 1105, the processor may proceed to operation 1031 of FIG. 10A or operation 1071 of FIG. 10B. For example, in response to being in communication with the door lock through MST, BT or BLE, the processor may proceed to operation 1031 of FIG. 10A. In response to being in communication with the door lock through NFC, the processor may proceed to operation 1071 of FIG. 10B.

According to various embodiments of the disclosure, a method for managing a credential in an electronic device (e.g., a second electronic device (30, 530, 630, 730), an electronic device (201)) may comprise launching an application related with an electronic key of a door lock (e.g., a door lock (40, 406, 640, 740)); receiving an input that uses the electronic key to open the door lock through the application; determining the validity of credential information related with the input, at least partially based on a timestamp provided by a hardware-based security element (e.g., a security element (53, 63, 73)); and controlling opening or non-opening of the door lock based on the validity of the credential information.

According to various embodiments, the determining the validity may comprise determining the validity of the credential information by the embedded security element (eSE).

According to various embodiments, the determining the validity may comprise allowing the eSE to check at least one of: the credential information, a key type, expiration information or a key use limit.

According to various embodiments, the method may further comprise identifying whether the electronic key is a temporal key comprising credential information of limited use, and determining the validity is performed in response to the electronic key being the temporal key.

According to various embodiments, the method may further comprise identifying whether a limit condition of the temporal key has expired; and in response to the limit condition expiring, deleting the temporal key.

According to various embodiments, the method may further comprise notifying the deletion of the temporal key to a previously given server managing the electronic key.

According to various embodiments, the controlling the opening or non-opening of the door lock may comprise providing and transmitting a command of opening of the door lock to the door lock in response to the credential information being valid; and deleting the credential information in response to the credential information not being valid.

According to various embodiments, the method may further comprise identifying whether communication with a previously given server is available; sending a request for determination of the validity of the credential information to the server in response to the communication with the server being available; and receiving the determination result, and determining the validity of the credential information based on the received determination result.

Various embodiments of the disclosure may safely manage an electronic key (e.g., a temporal key), regardless of a communication state. For example, in response to communication with a server being available, an electronic device of an embodiment of the disclosure may check (or determine) the validity of the electronic key. In response to the communication with the server being unstable (e.g., a received signal strength being equal to or being less than a reference value (e.g., −110 dBm)) or being unavailable, the electronic device may check (or determine) the validity of the electronic key based on a timestamp of the security element (e.g., trust zone) for which hacking is impossible.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The various example embodiments illustrated and disclosed herein are provided for explaining and understanding, and do not limit the scope of the technology mentioned in the present disclosure. Accordingly, the scope of the present disclosure should be understood as including all modifications which are based on the technological spirit of the present disclosure.

What is claimed is:

1. An electronic device comprising:
   a wireless communication circuit;
   a hardware-based security element comprising circuitry configured to provide a timestamp;
   a processor operatively coupled with the communication circuit and the security element; and
   a memory operatively coupled with the processor,
   wherein the memory stores instructions that, when executed by the processor, are configured to control the electronic device to:
   launch an application related with an electronic key of a door lock;
   receive an input for using the electronic key to open the door lock through the application;
   identify whether communication with a pre-designated server is available via the communication circuit;
   in response to the communication with the server being not available:
      receive the timestamp comprising a current time from the security element,
      determine validity of credential information related with the input, based at least in part on the timestamp; and
      open the door lock based on the validity of the credential information; and
   in response to the communication with the server being available:
      send a request for determination of the validity of the credential information to the server,
      receive the determination result, and
      open the door lock based on the received determination result.

2. The electronic device of claim 1, wherein the instructions, when executed by the processor, control the electronic device to determine the validity of the credential information using an embedded security element (eSE).

3. The electronic device of claim 2, wherein the instructions, when executed by the processor, control the electronic device to allow the eSE to check at least one of: the credential information, a key type, expiration information or a key use limit.

4. The electronic device of claim 1, wherein the instructions, when executed by the processor, control the electronic device to identify whether the electronic key is a temporal key comprising credential information of limited use and determine the validity of the credential information in response to the electronic key being the temporal key.

5. The electronic device of claim 4, wherein the instructions, when executed by the processor, control the electronic device to identify whether a limit condition of the temporal key has expired and delete the temporal key in response to the limit condition expiring.

6. The electronic device of claim 5, wherein the instructions, when executed by the processor, control the electronic device to notify the deletion of the temporal key to a pre-designated server managing the electronic key.

7. The electronic device of claim 1, wherein the instructions, when executed by the processor, control the electronic device to:
   generate and transmit a command of opening of the door lock to the door lock in response to the credential information being valid; and
   delete the credential information in response to the credential information not being valid.

8. An electronic device comprising:
   a communication circuit;
   a hardware-based security element comprising circuitry configured to provide a timestamp;
   a near field communication (NFC) communication circuit;
   a processor operatively coupled with the communication circuit and the security element; and
   a memory operatively coupled with the processor,
   wherein the memory stores instructions that, when executed by the processor, are configured to control the electronic device to:
   receive a request for transmission of an electronic key for opening of a door lock from the door lock through the communication circuit in response to approaching within a specific distance from the door lock;
   search for an electronic key related with the door lock;
   identify whether communication with a pre-designated server is available via the communication circuit;
   in response to the communication with the server being not available: determine validity of credential information related with the searched electronic key based at least in part on the timestamp, and open the door lock based on the validity of the credential information; and
   in response to the communication with the server being available, send a request for determination of the validity of the credential information to the server, receive the determination result, and open the door lock based on the received determination result.

9. The electronic device of claim 8, wherein the instructions, when executed by the processor, control the electronic device to search the electronic key using an embedded security element (eSE), and determine the validity of the credential information.

10. The electronic device of claim 9, wherein the instructions, when executed by the processor, control the electronic device to:
    identify whether the searched electronic key is a temporal key comprising credential information of limited use; and
    determine the validity of the credential information in response to the searched electronic key being the temporal key.

11. The electronic device of claim 8, wherein the instructions, when executed by the processor, control the electronic device to:
    provide and transmit a command of opening of the door lock to the door lock in response to the credential information being valid; and
    delete the credential information in response to the credential information not being valid.

12. A method for managing a credential in an electronic device, the method comprising:
    launching an application related with an electronic key of a door lock;
    receiving an input for using the electronic key to open the door lock through the application;
    identifying whether communication with a pre-designated server is available via a communication circuit;

in response to the communication with the server being not available:
- receiving a timestamp provided by a hardware-based security element in the electronic device, the timestamp comprising a current time,
- determining validity of credential information related with the input, based at least in part on the timestamp; and
- controlling opening or non-opening of the door lock based on the validity of the credential information; and in response to the communication with the server being available:
- sending a request for determination of the validity of the credential information to the server,
- receiving the determination result, and
- controlling opening or non-opening of the door lock based on the received determination result.

13. The method of claim 12, wherein determining the validity comprises determining the validity of the credential information by an embedded security element (eSE).

14. The method of claim 13, wherein determining the validity comprises checking, using the eSE, at least one of: the credential information, a key type, expiration information or a key use limit.

15. The method of claim 12, further comprising identifying whether the electronic key is a temporal key comprising credential information of limited use, and determining the validity is performed in response to the electronic key being the temporal key.

16. The method of claim 15, further comprising:
- identifying whether a limit condition of the temporal key has expired; and
- deleting the temporal key in response to the limit condition expiring.

17. The method of claim 16, further comprising notifying the deletion of the temporal key to a pre-designated server managing the electronic key.

18. The method of claim 12, wherein controlling the opening or non-opening of the door lock comprises:
- generating and transmitting a command for opening of the door lock to the door lock in response to the credential information being valid; and
- deleting the credential information in response to the credential information not being valid.

* * * * *